Figure 9:
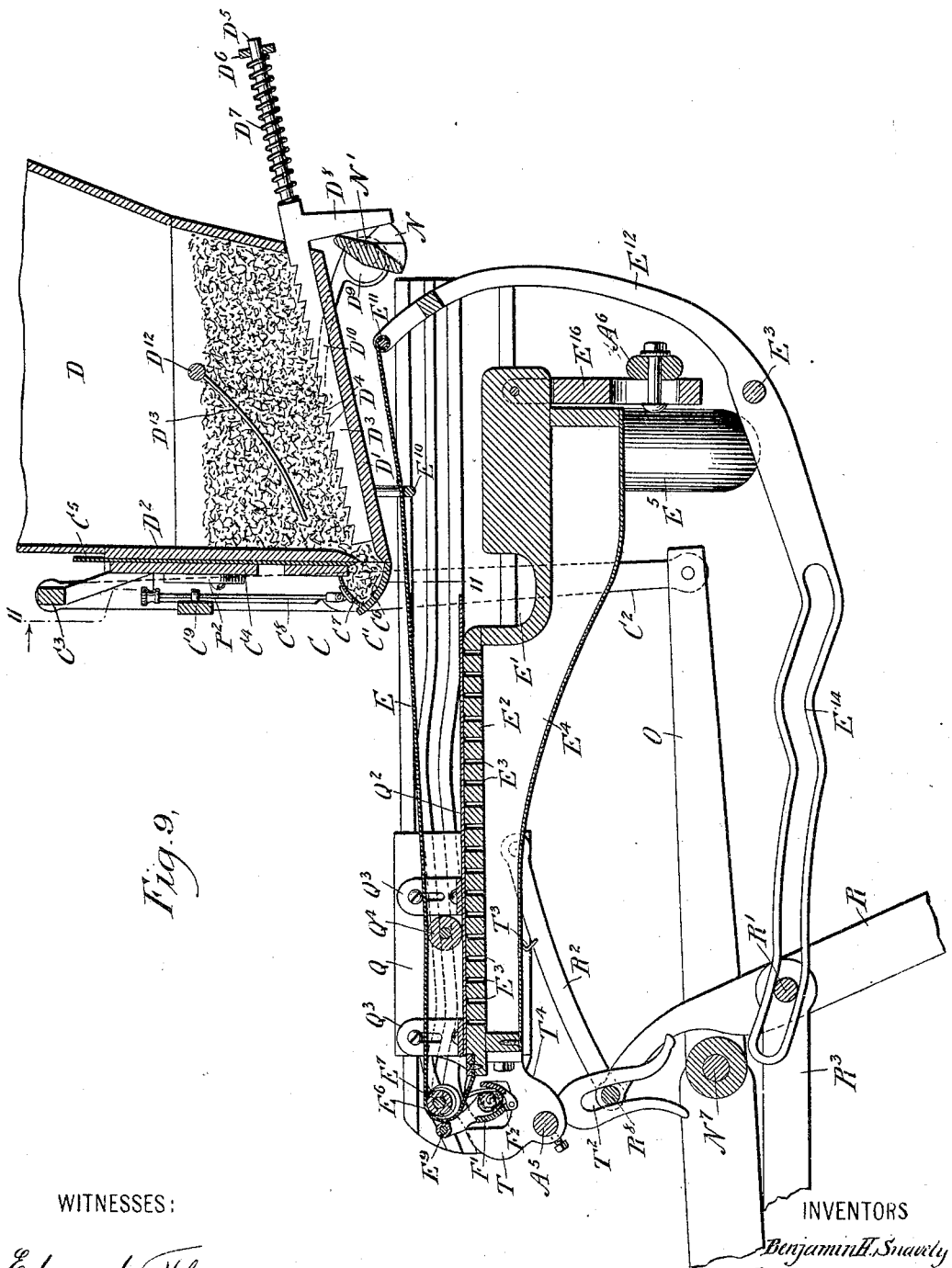

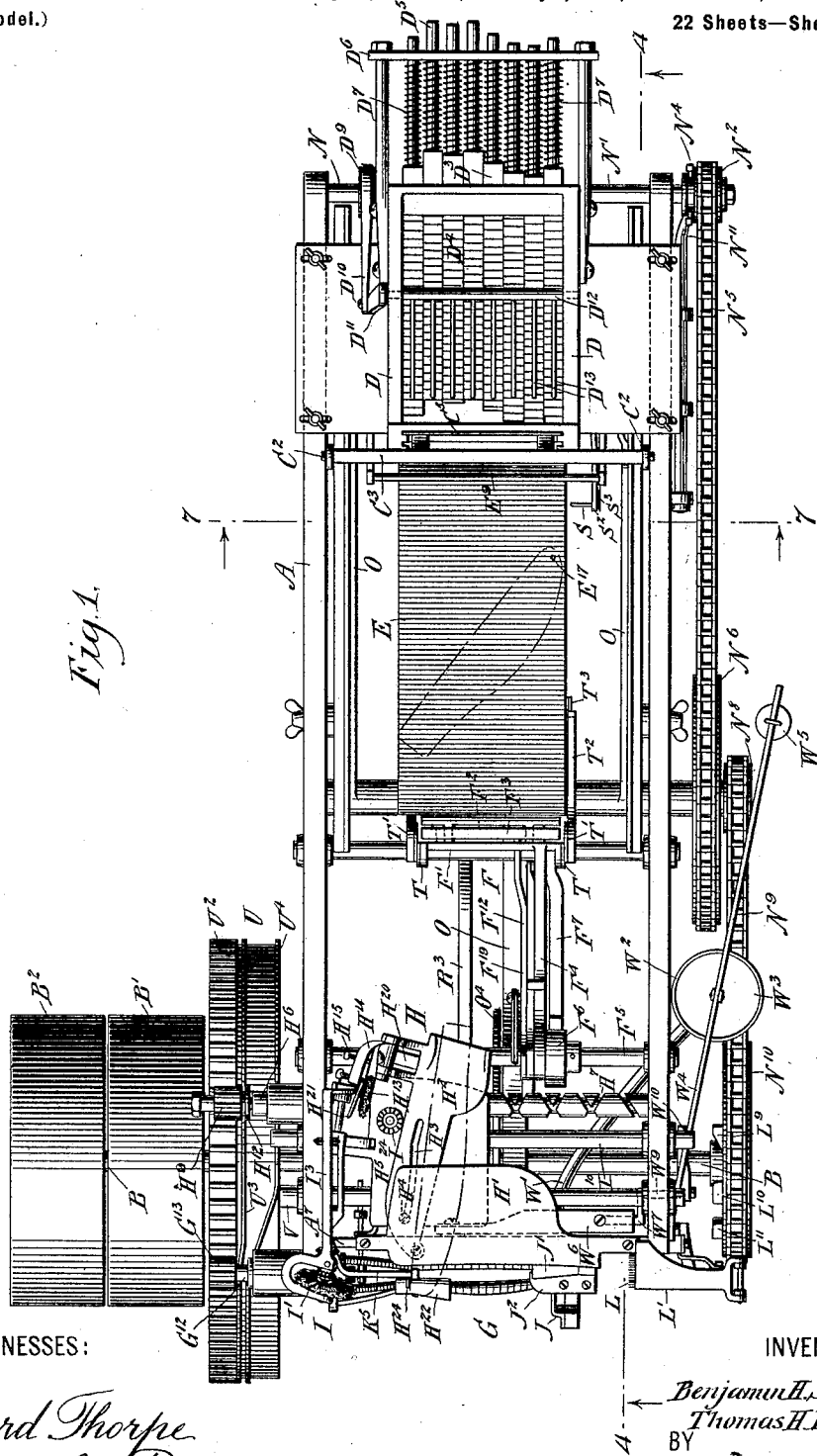

No. 706,267. Patented Aug. 5, 1902.
B. H. SNAVELY & T. H. KELLER.
AUTOMATIC CIGAR MAKING MACHINE.
(Application filed Aug. 30, 1900. Renewed May 8, 1901.)
(No Model.) 22 Sheets—Sheet 2.
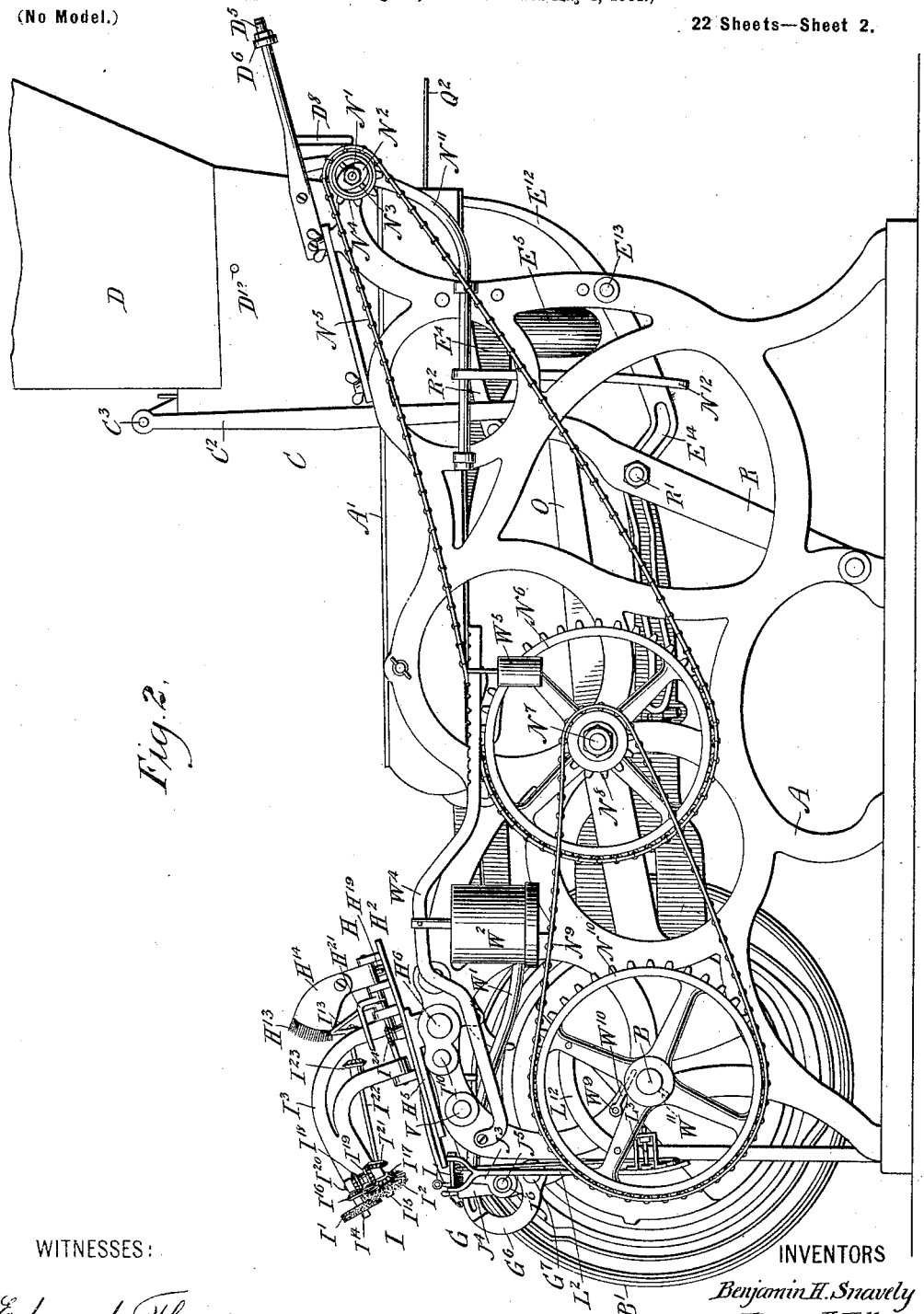
WITNESSES:
Edward Thorpe
Theo. G. Hosted
INVENTORS
Benjamin H. Snavely
Thomas H. Keller
BY
ATTORNEYS

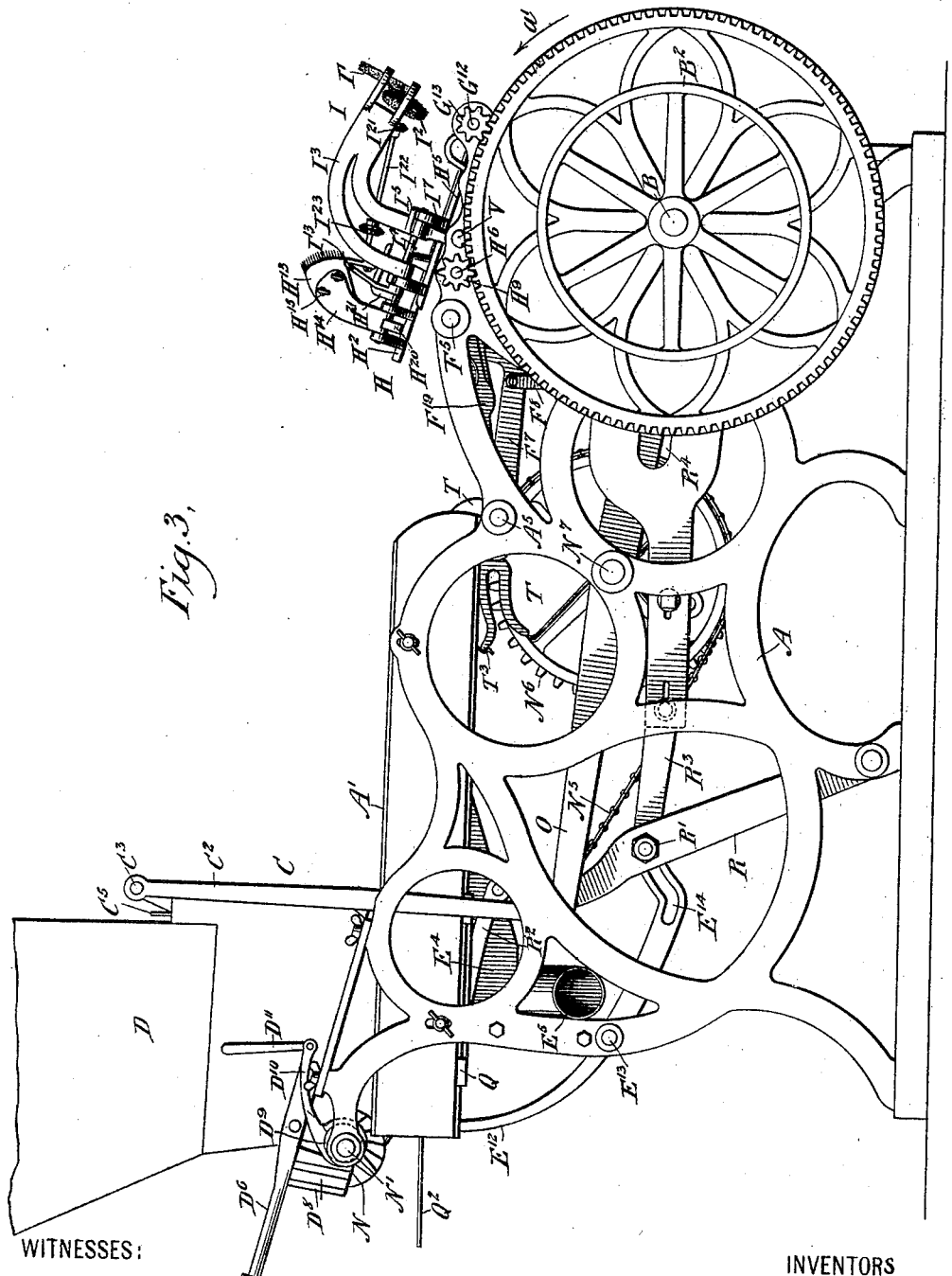

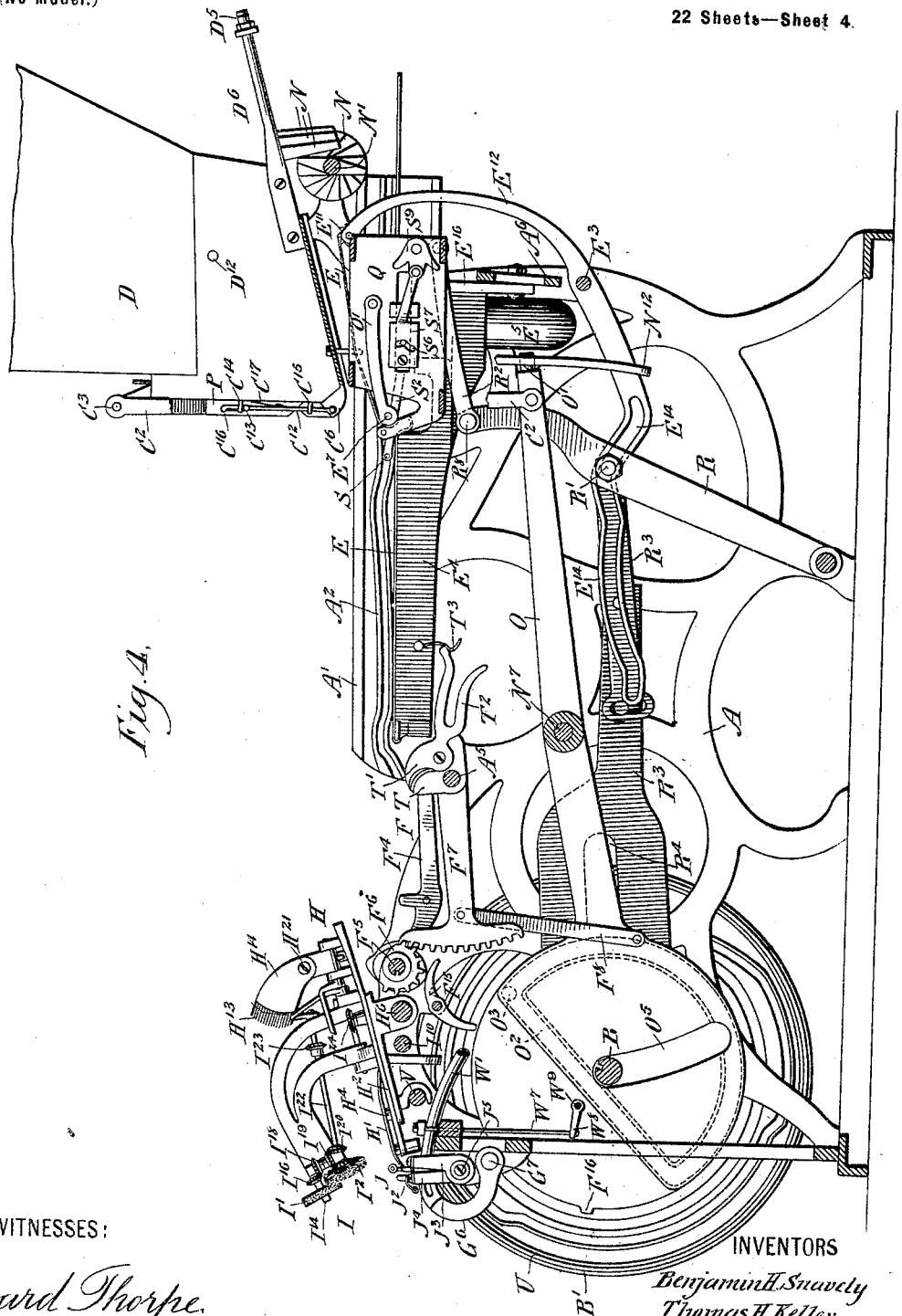

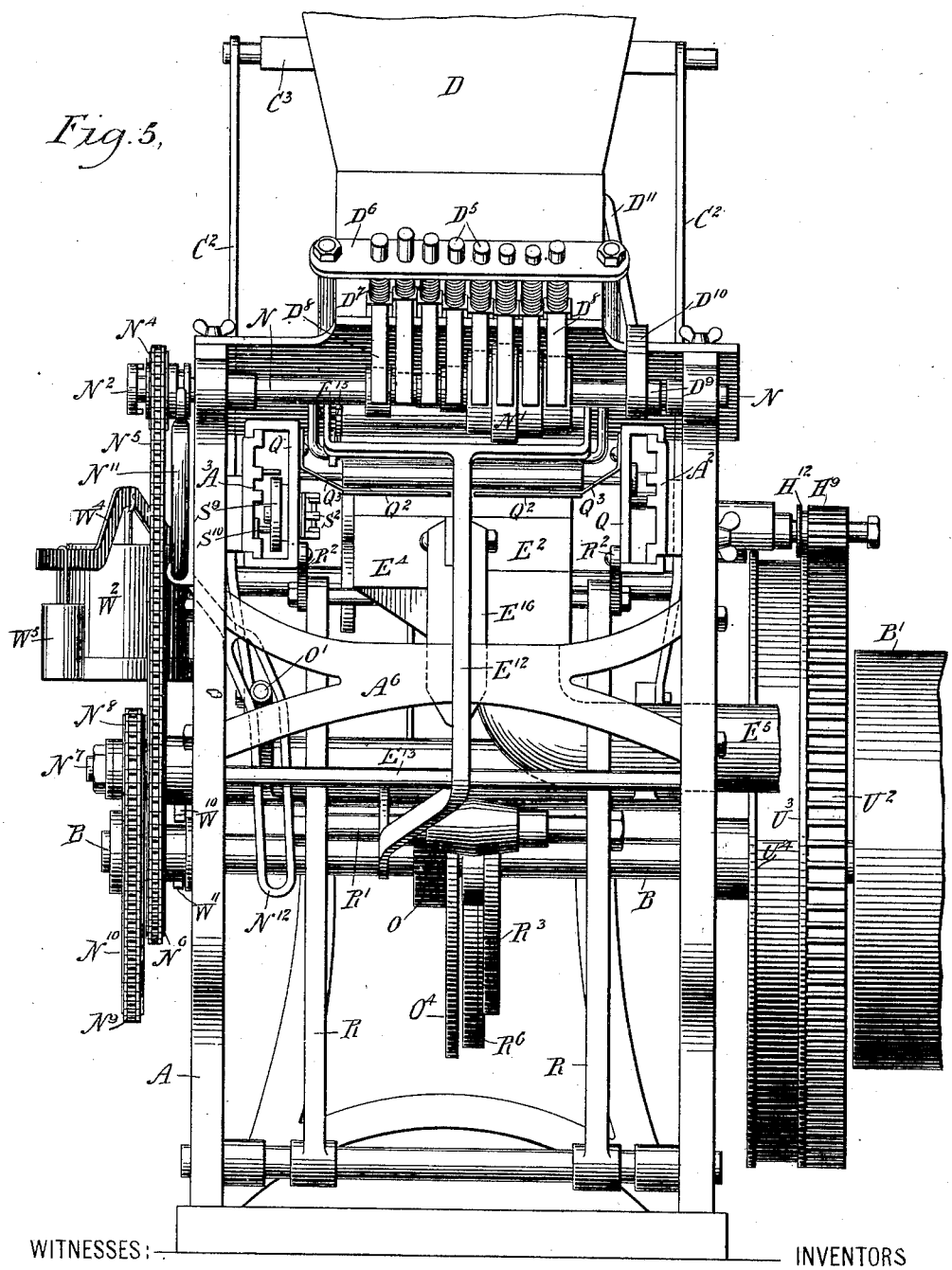

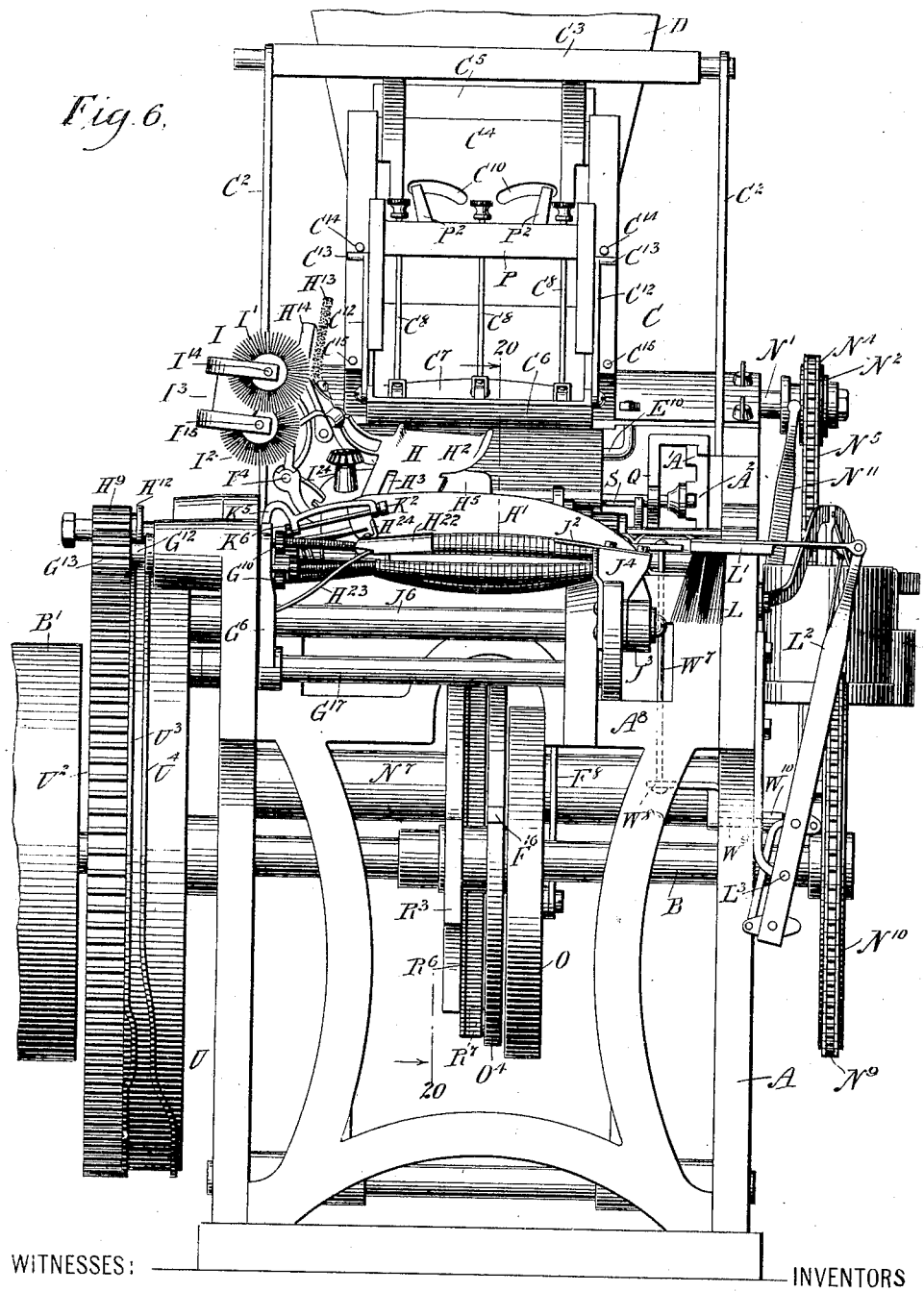

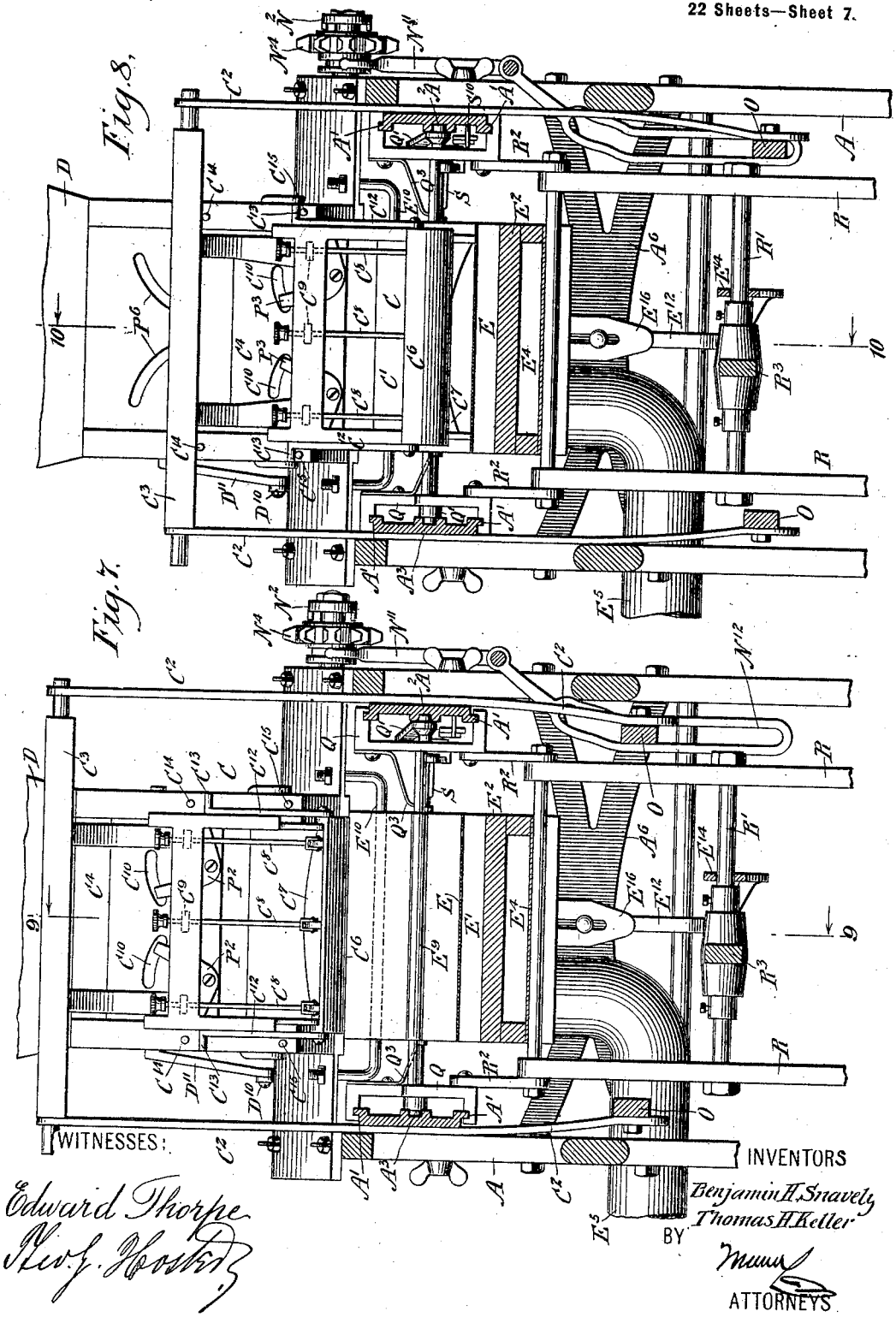

No. 706,267. Patented Aug. 5, 1902.
B. H. SNAVELY & T. H. KELLER.
AUTOMATIC CIGAR MAKING MACHINE.
(Application filed Aug. 30, 1900. Renewed May 8, 1901.)

(No Model.) 22 Sheets—Sheet 8.

WITNESSES:
Edward Thorpe
Rev. G. Hoster

INVENTORS
Benjamin H. Snavely
Thomas H. Keller
BY
ATTORNEYS

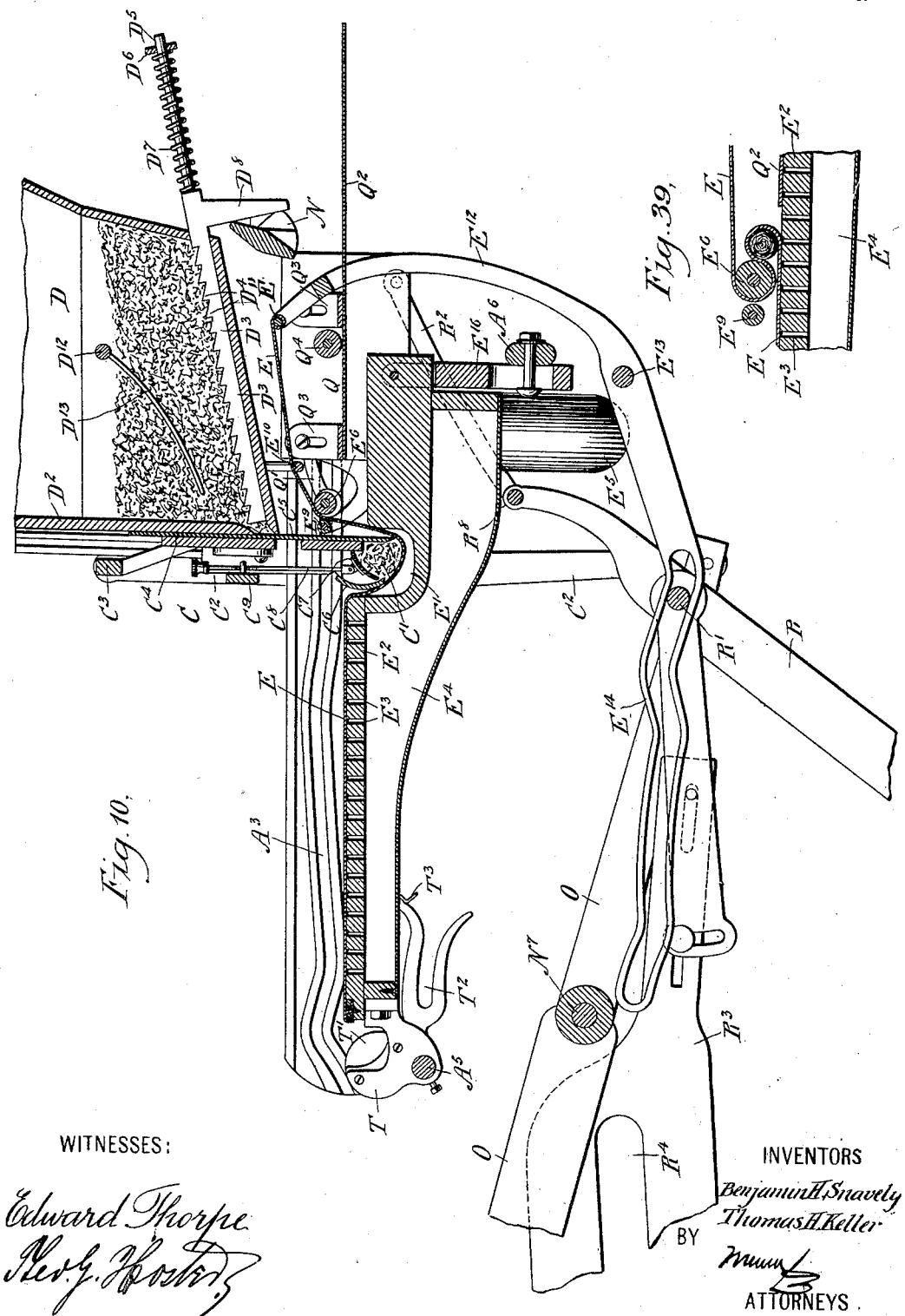

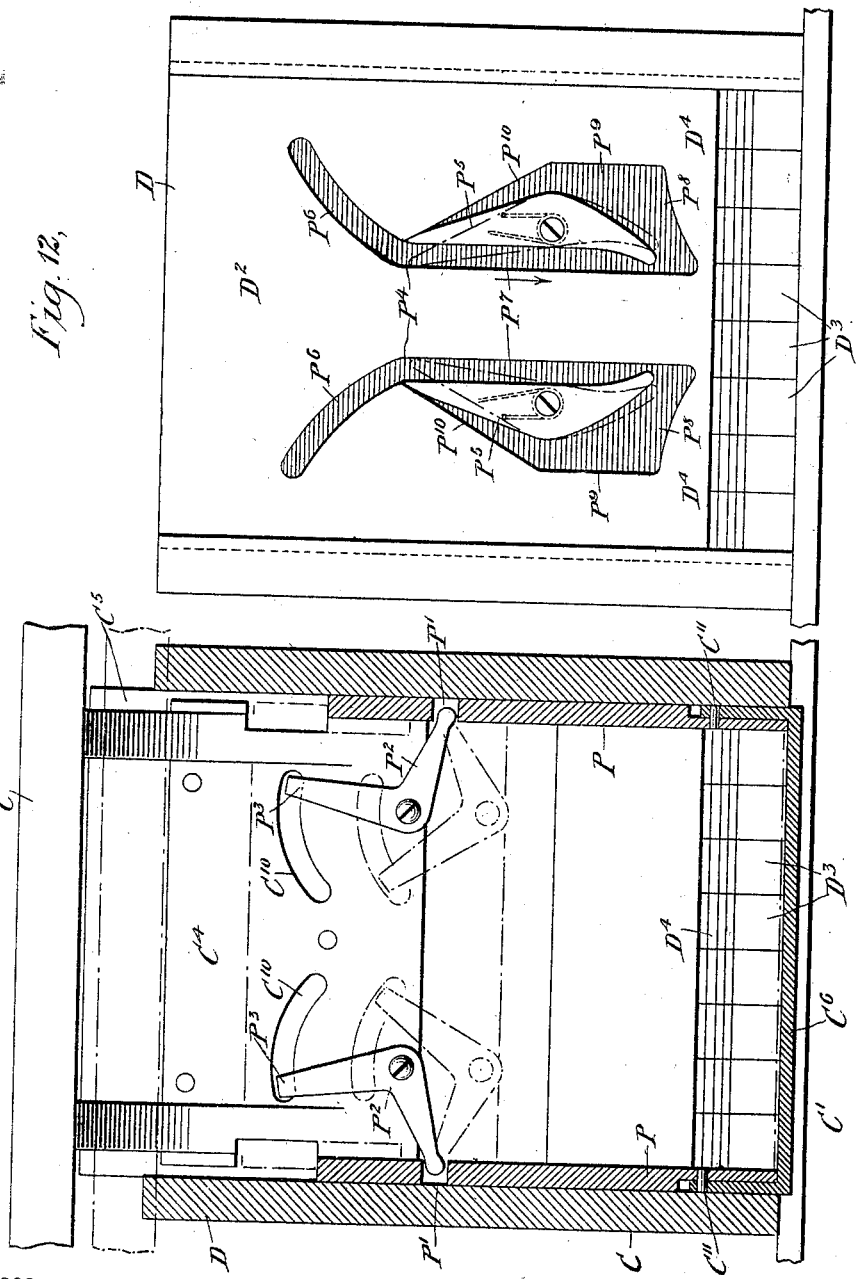

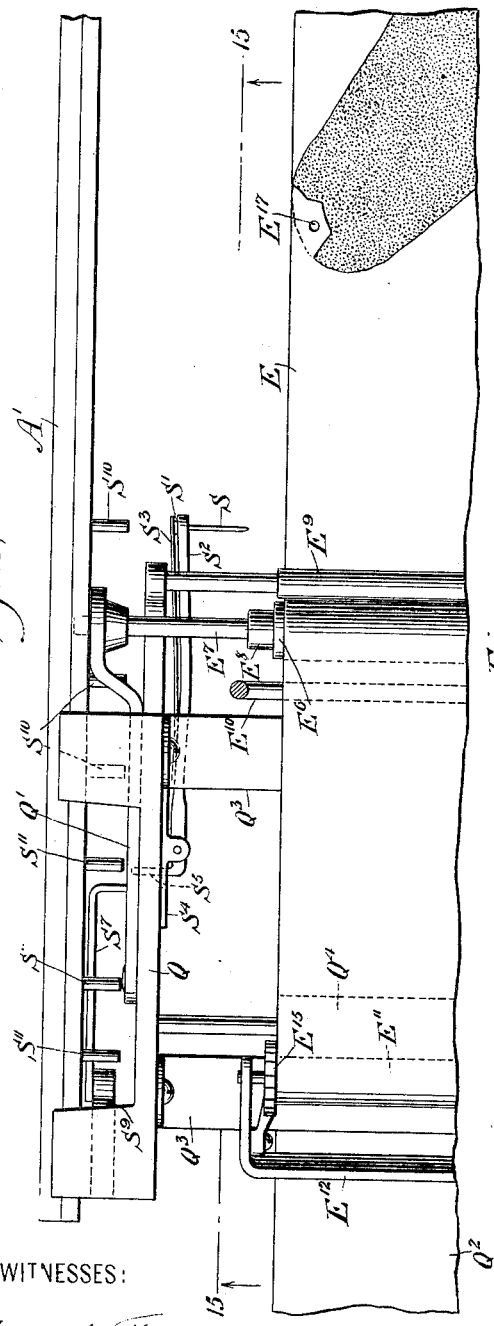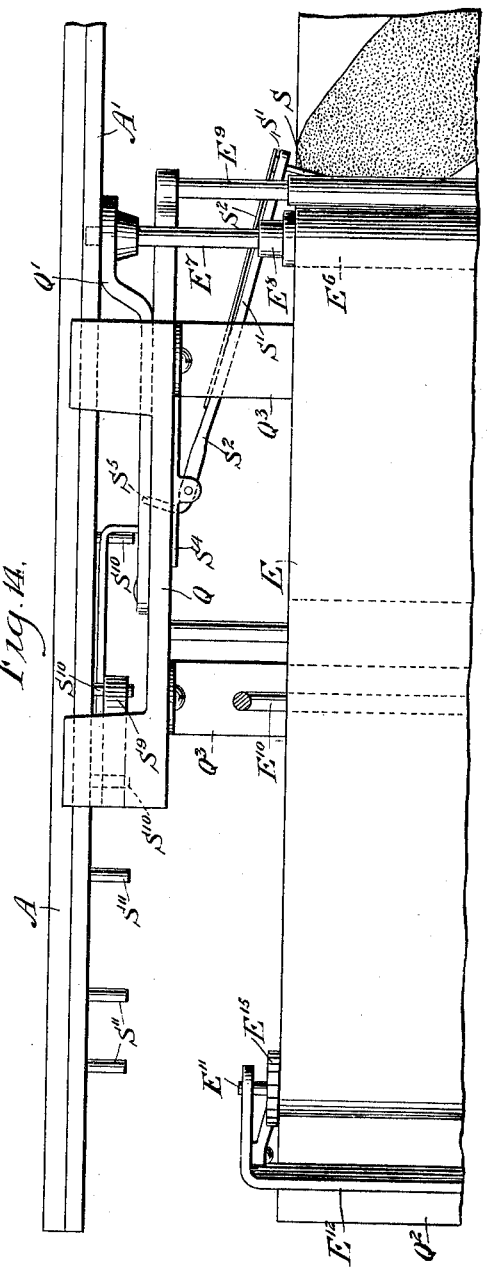

No. 706,267. Patented Aug. 5, 1902.
B. H. SNAVELY & T. H. KELLER.
AUTOMATIC CIGAR MAKING MACHINE.
(Application filed Aug. 30, 1900. Renewed May 8, 1901.)
(No Model.) 22 Sheets—Sheet 12.
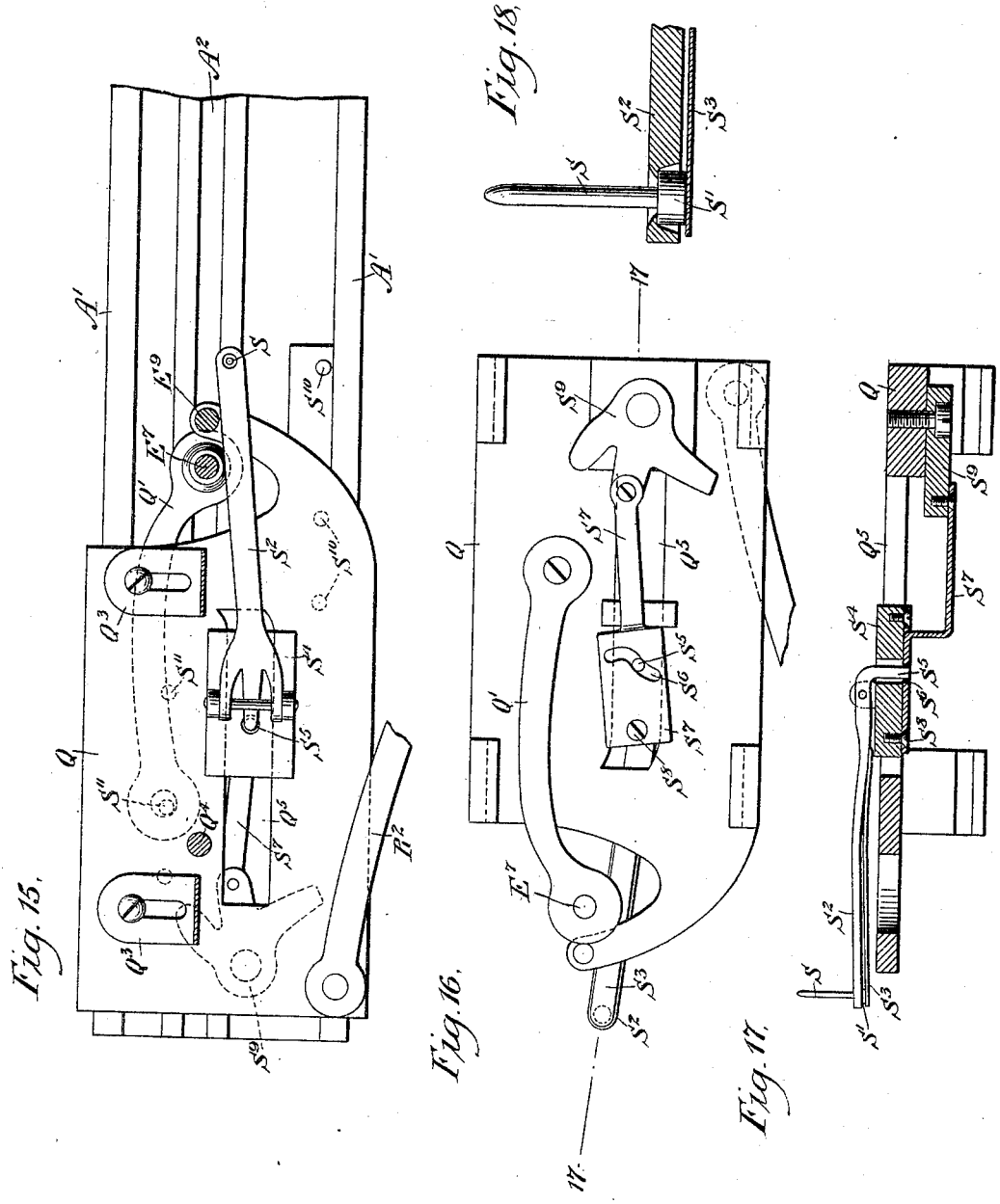
WITNESSES:
Edward Thorpe
INVENTORS
Benjamin H. Snavely
Thomas H. Keller
BY
ATTORNEYS

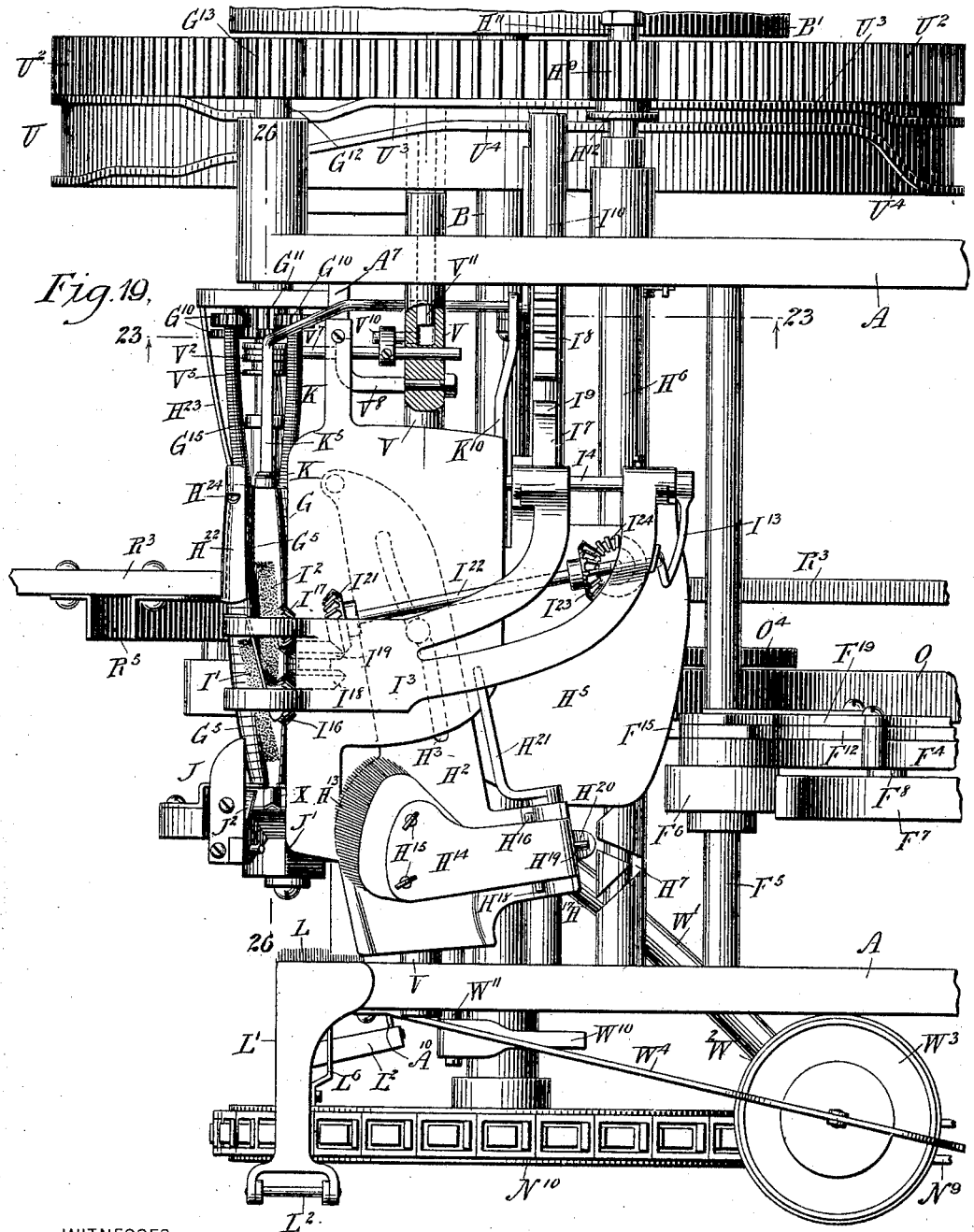

No. 706,267. Patented Aug. 5, 1902.
B. H. SNAVELY & T. H. KELLER.
AUTOMATIC CIGAR MAKING MACHINE.
(Application filed Aug. 30, 1900. Renewed May 8, 1901.)

(No Model.) 22 Sheets—Sheet 14.

Fig. 20.

WITNESSES:
Edward Thorpe
Geo. G. Hoster

INVENTORS
Benjamin H. Snavely
Thomas H. Keller
BY
ATTORNEYS

No. 706,267. Patented Aug. 5, 1902.
B. H. SNAVELY & T. H. KELLER.
AUTOMATIC CIGAR MAKING MACHINE.
(Application filed Aug. 30, 1900. Renewed May 8, 1901.)

(No Model.) 22 Sheets—Sheet 15.

No. 706,267. Patented Aug. 5, 1902.
B. H. SNAVELY & T. H. KELLER.
AUTOMATIC CIGAR MAKING MACHINE.
(Application filed Aug. 30, 1900. Renewed May 8, 1901.)

(No Model.) 22 Sheets—Sheet 17.

WITNESSES: INVENTORS
Benjamin H. Snavely
Thomas H. Keller
BY
ATTORNEYS

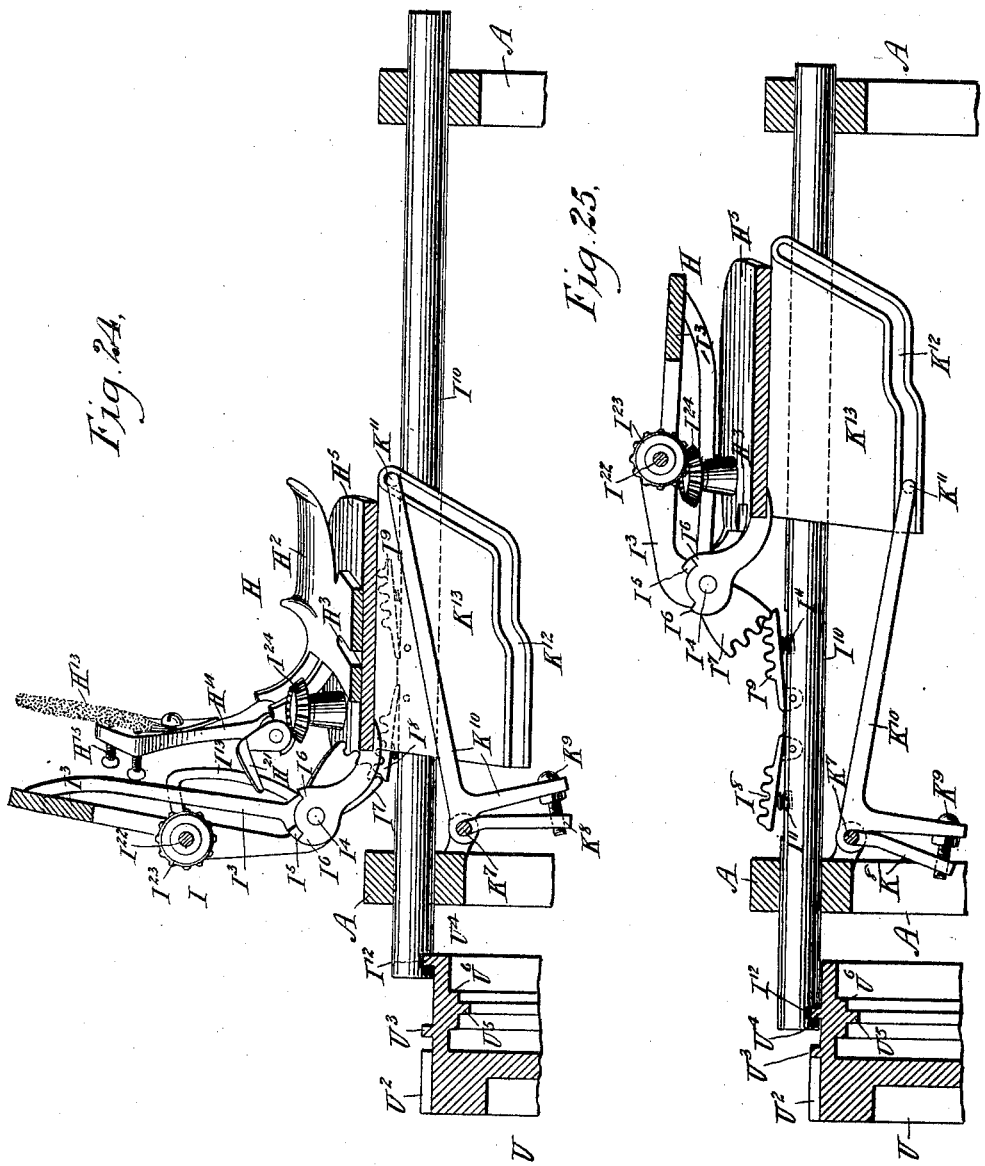

No. 706,267. Patented Aug. 5, 1902.
B. H. SNAVELY & T. H. KELLER.
AUTOMATIC CIGAR MAKING MACHINE.
(Application filed Aug. 30, 1900. Renewed May 8, 1901.)
(No Model.) 22 Sheets—Sheet 19.
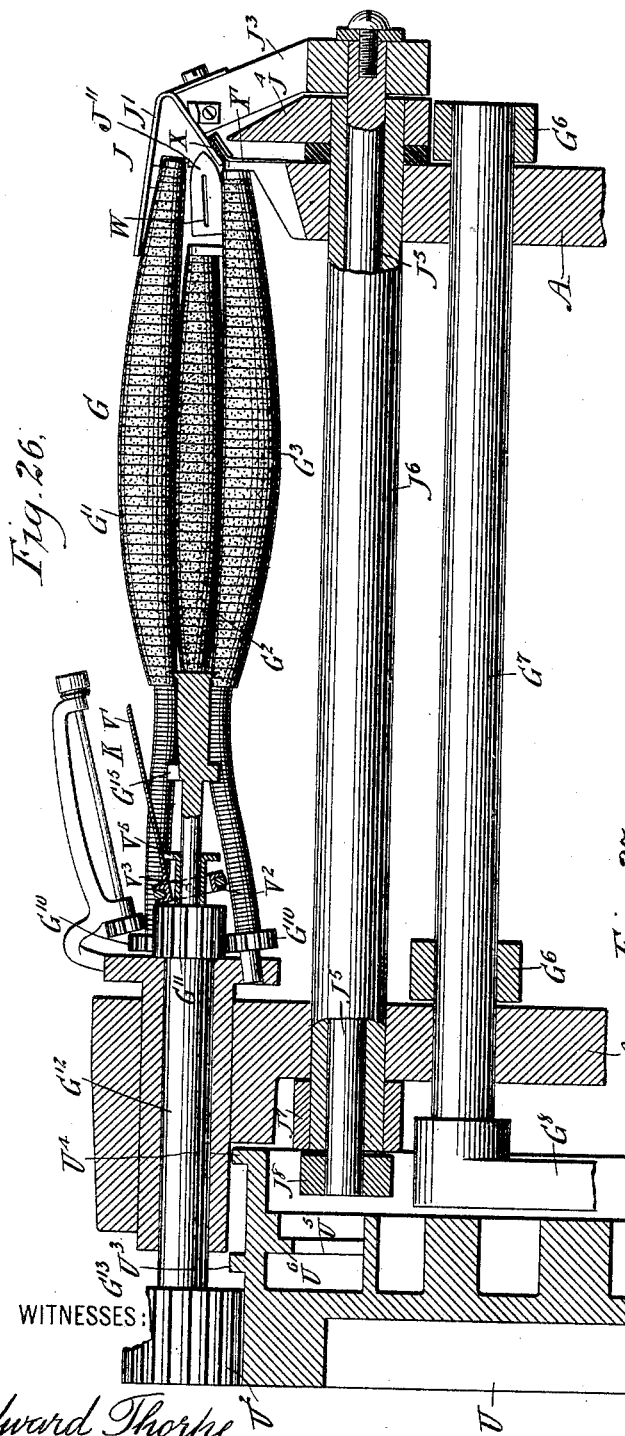
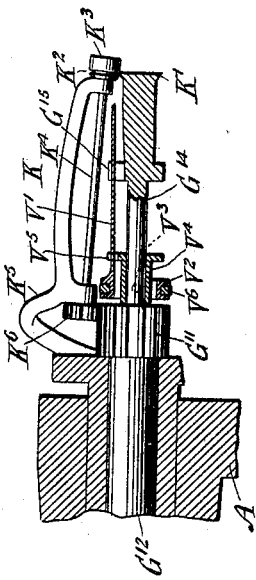
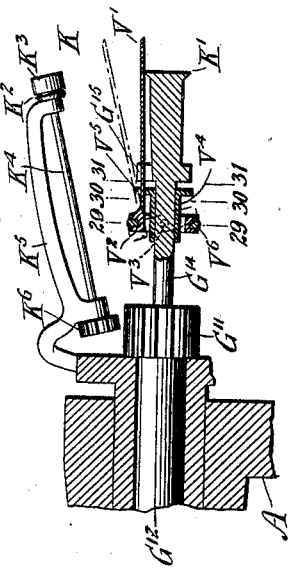
WITNESSES:
Edward Thorpe
INVENTORS
Benjamin H. Snavely
Thomas H. Keller
BY
ATTORNEYS No. 706,267. Patented Aug. 5, 1902.
B. H. SNAVELY & T. H. KELLER.
AUTOMATIC CIGAR MAKING MACHINE.
(Application filed Aug. 30, 1900. Renewed May 8, 1901.)
(No Model.) 22 Sheets—Sheet 20.
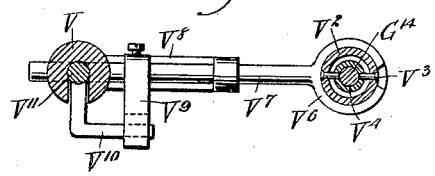
Fig. 29.
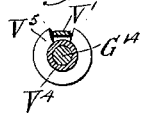
Fig. 30.
Fig. 31.
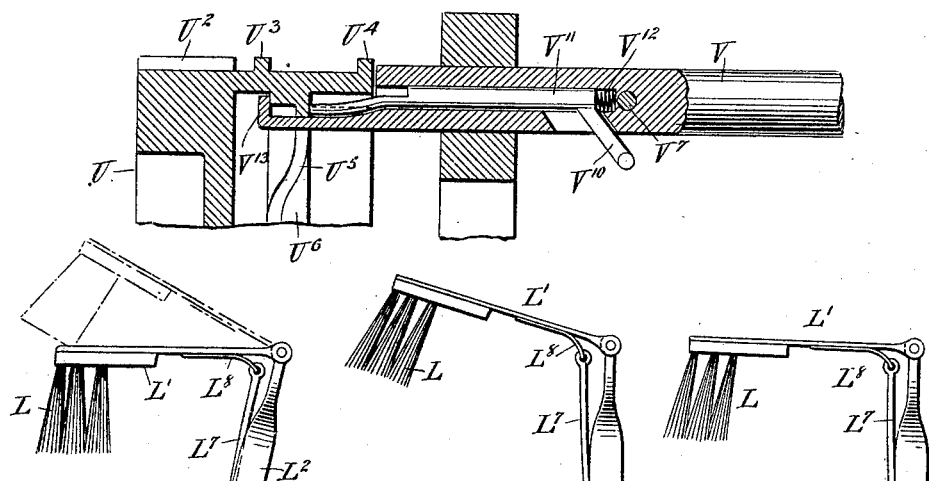
Fig. 32.
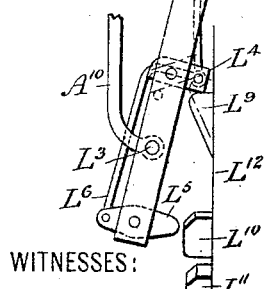
Fig. 33.
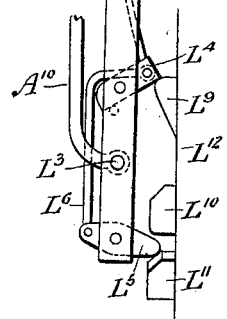
Fig. 34.
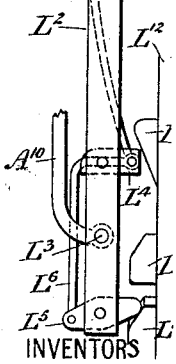
Fig. 35.
WITNESSES:
Edward Thorpe
INVENTORS
Benjamin H. Snavely
Thomas H. Keller
BY
ATTORNEYS No. 706,267. Patented Aug. 5, 1902.
B. H. SNAVELY & T. H. KELLER.
AUTOMATIC CIGAR MAKING MACHINE.
(Application filed Aug. 30, 1900. Renewed May 8, 1901.)
(No Model.) 22 Sheets—Sheet 21.
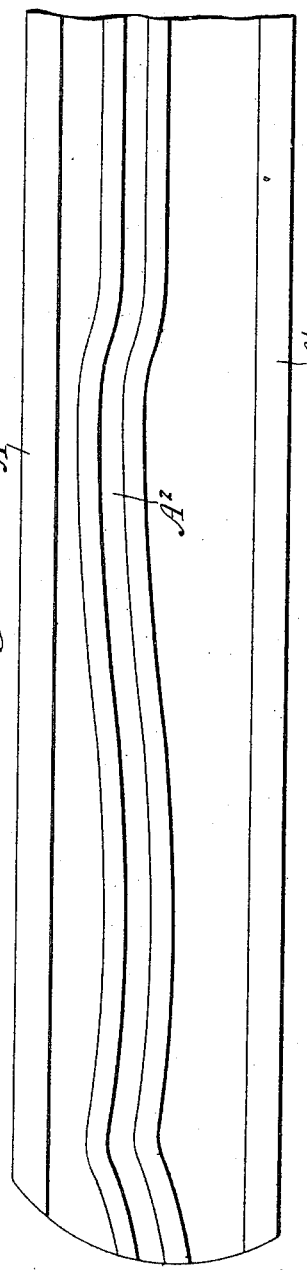
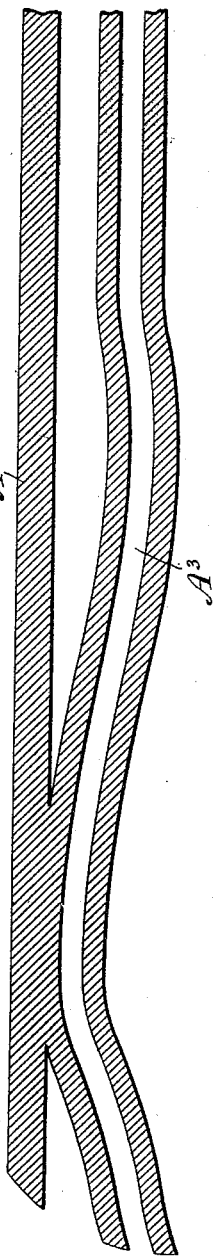
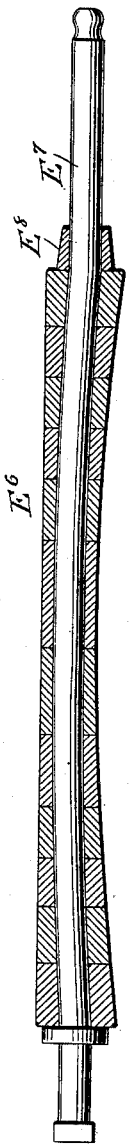

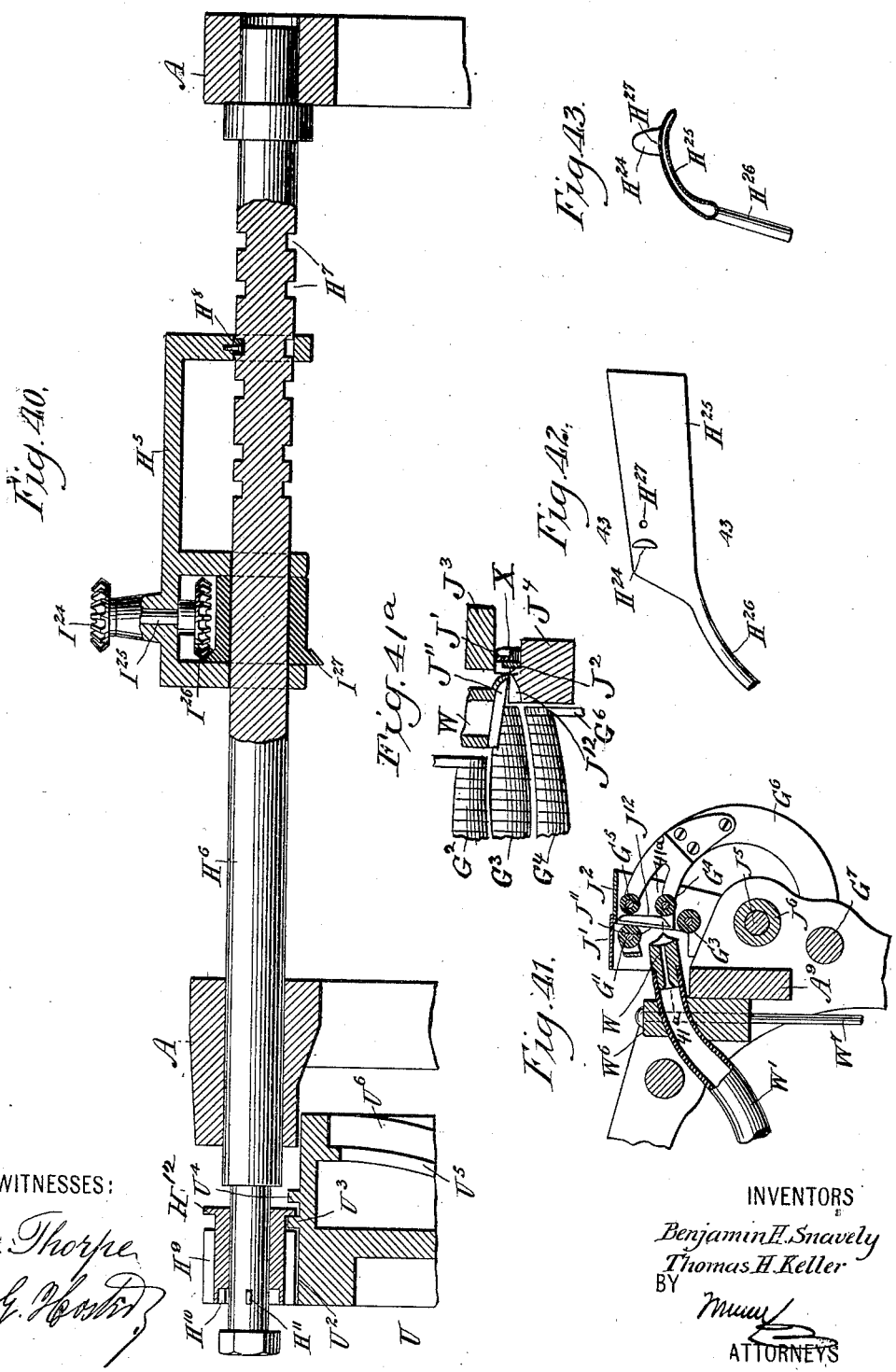

UNITED STATES PATENT OFFICE.

BENJAMIN H. SNAVELY, OF BRUNNERSVILLE, AND THOMAS H. KELLER, OF LITITZ, PENNSYLVANIA.

AUTOMATIC CIGAR-MAKING MACHINE.

SPECIFICATION forming part of Letters Patent No. 706,267, dated August 5, 1902.

Application filed August 30, 1900. Renewed May 8, 1901. Serial No. 59,280. (No model.)

*To all whom it may concern:*

Be it known that we, BENJAMIN H. SNAVELY, a resident of Brunnersville, and THOMAS H. KELLER, a resident of Lititz, in the county of Lancaster and State of Pennsylvania, citizens of the United States, have invented a new and Improved Automatic Cigar-Making Machine, of which the following is a full, clear, and exact description.

The object of the invention is to provide a new and improved cigar-making machine arranged to successively and rapidly produce perfect cigars by automatically compacting the tobacco in predetermined quantities, rolling the compacted filler and placing a binder around it to form a complete bunch of a desired shape and size, rolling a wrapper around the bunch and securing it in place and cutting off the surplus material, so that a complete and perfect cigar is finally discharged from the machine ready for packing into boxes, it being only necessary on the part of a single attendant to keep the hopper filled with tobacco for the filler and to place the binders and wrappers in proper position on the machine.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 21:
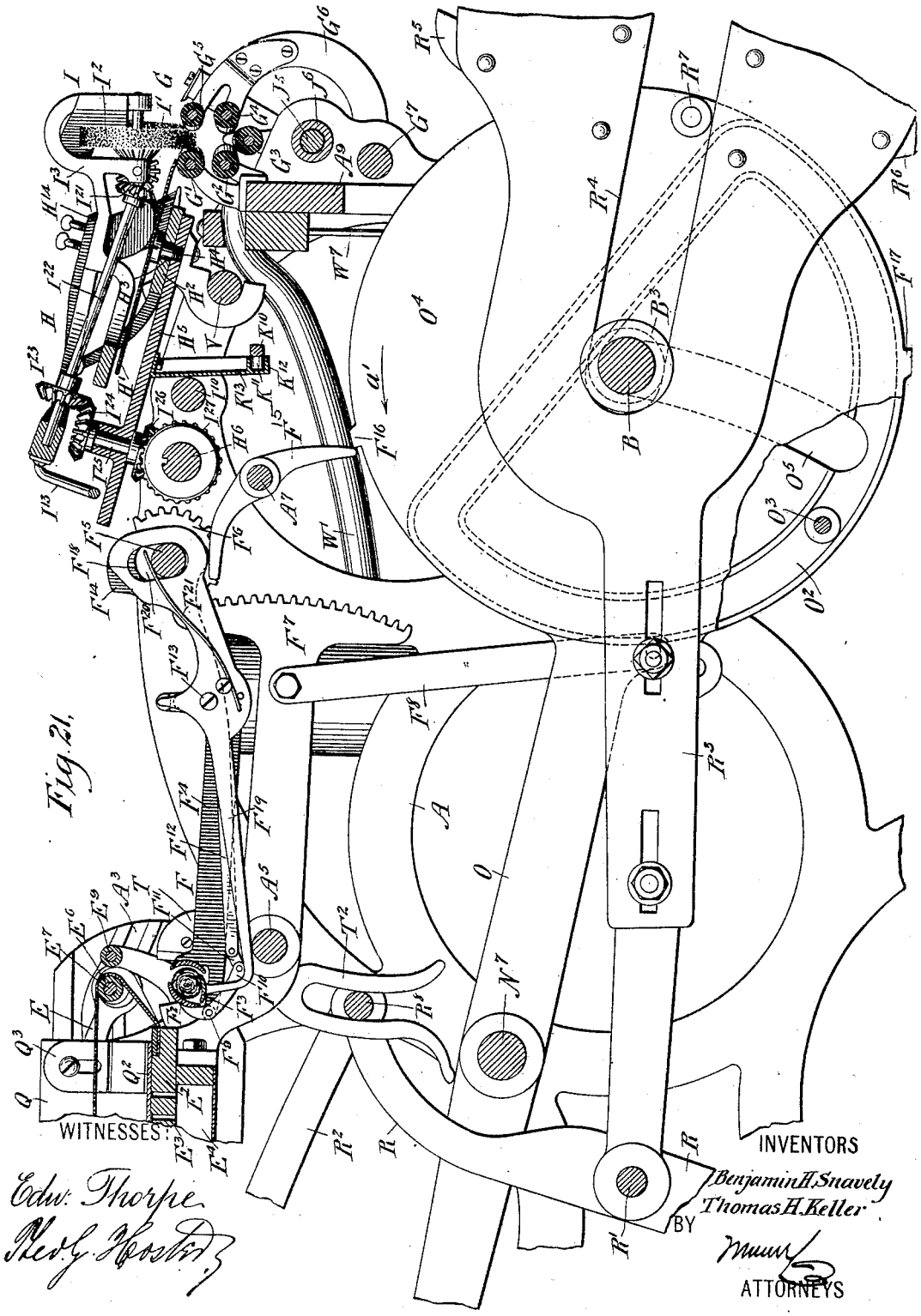
Figure 22:
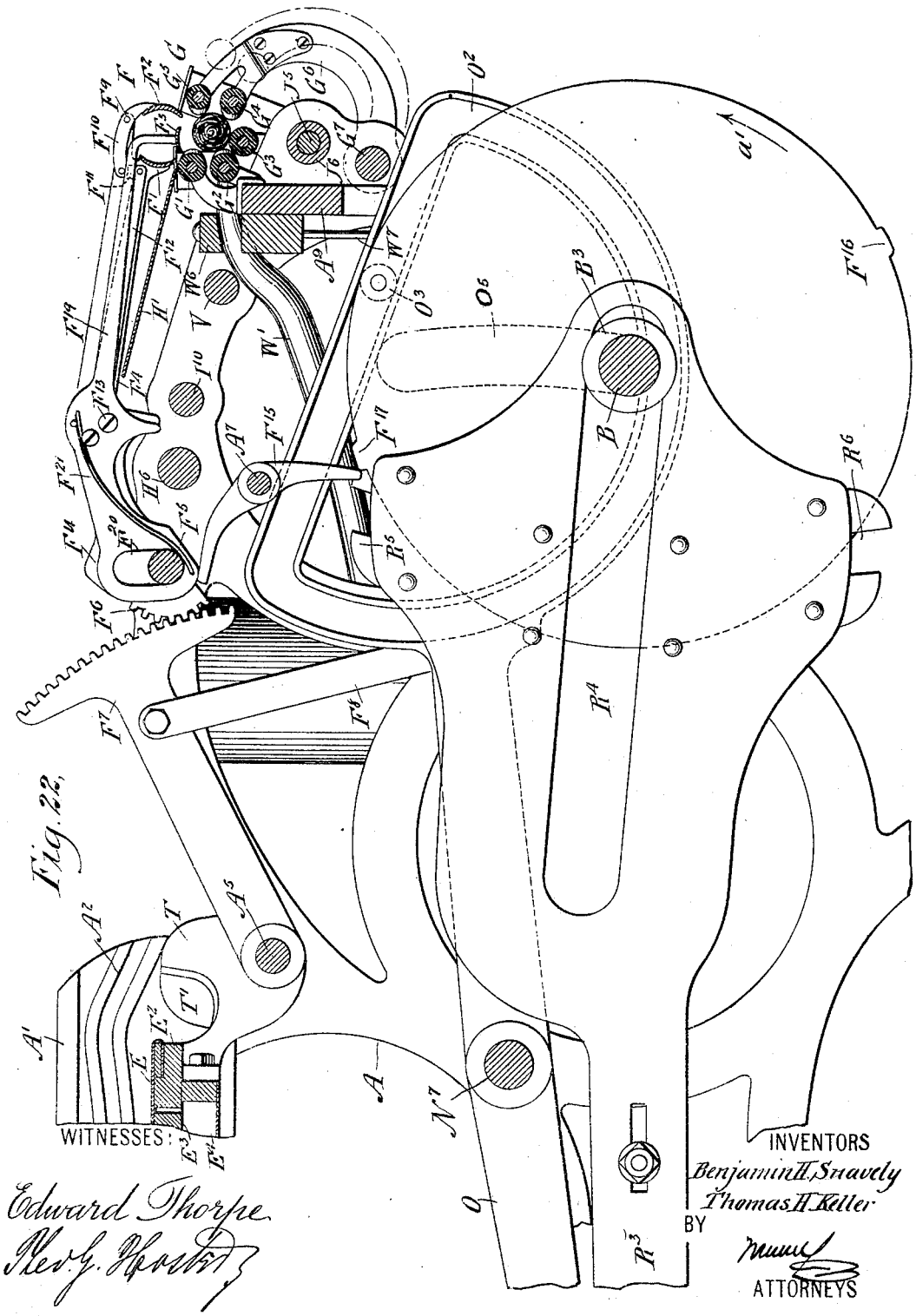
Figure 23:
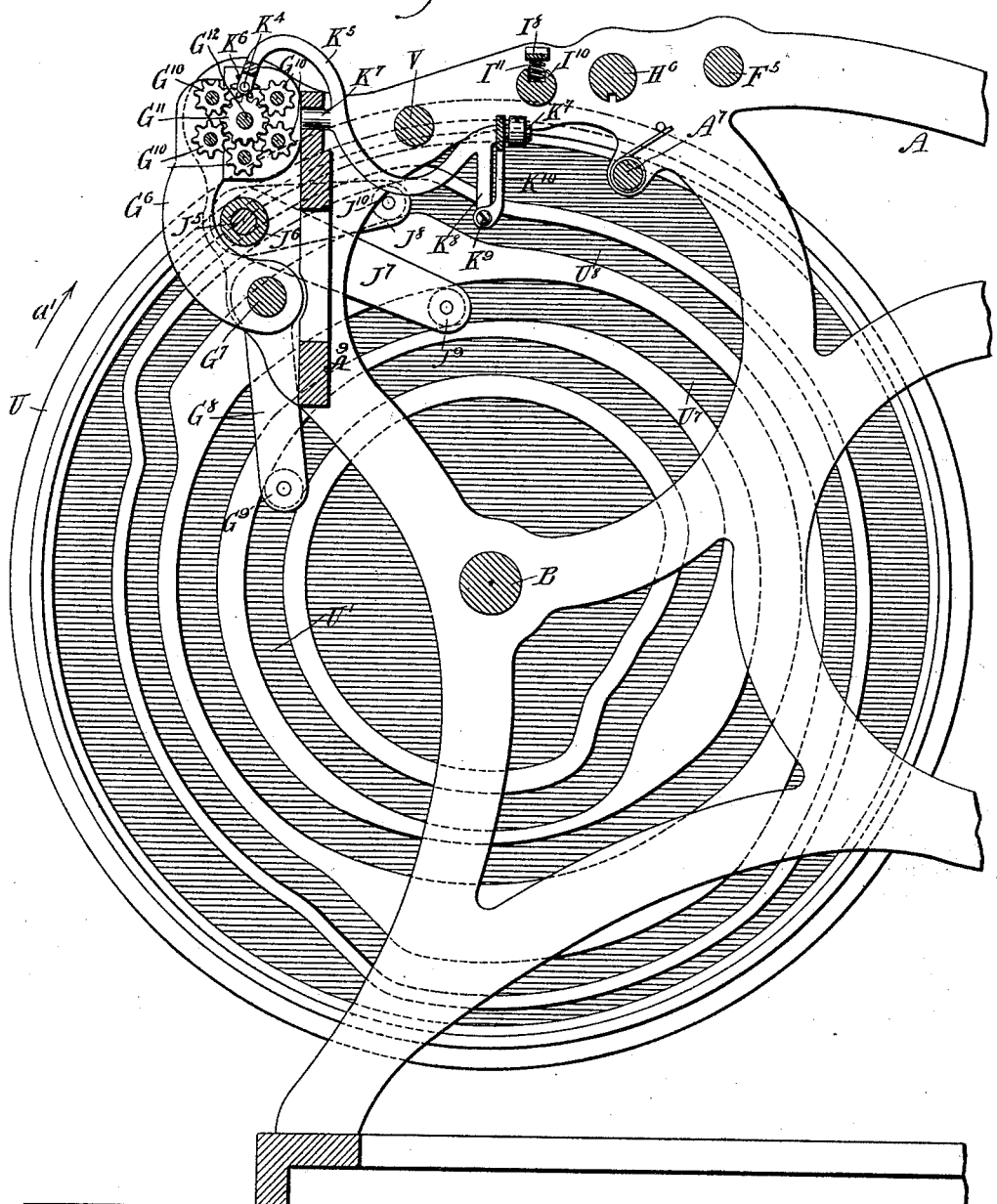

Figure 1 is a plan view of the improvement. Fig. 2 is a side elevation of the same. Fig. 3 is a side elevation of the same looking in an opposite direction from Fig. 2. Fig. 4 is a longitudinal sectional elevation of the same on the line 4 4 in Fig. 1. Fig. 5 is an enlarged rear end elevation of the same. Fig. 6 is an enlarged front elevation of the same. Fig. 7 is an enlarged transverse section of the improvement on the line 7 7 in Fig. 1 looking rearwardly. Fig. 8 is a like view of the same with parts in a different position. Fig. 9 is an enlarged sectional side elevation of the compacting device and the bunch-forming mechanism with parts in a different position, the section being on the line 9 9 in Fig. 7. Fig. 10 is a like view of the same with parts in a different position, the section being on the line 10 10 in Fig. 8. Fig. 11 is an enlarged cross-section of the compacting-pocket and adjacent parts on the front face of the hopper. Fig. 12 is a front elevation of the front face of the hopper, showing the guideway and switches for the actuating devices of the compacting-pocket. Fig. 13 is an enlarged plan view of the apron and the mechanism for holding the binder in place on the apron. Fig. 14 is a like view of the same with parts in a different position. Fig. 15 is a sectional side elevation of the same on the line 15 15 in Fig. 13. Fig. 16 is a rear face view of part of the same. Fig. 17 is a sectional plan view of the same on the line 17 17 in Fig. 16. Fig. 18 is an enlarged plan view of the pin for holding the binder in place and the lever and spring carrying the pin and shown in section. Fig. 19 is an enlarged plan view with parts in section of the wrapping mechanism and adjacent parts employed for finishing the cigar. Fig. 20 is a rear sectional side elevation of the same, the section being on the line 20 20 in Fig. 6. Fig. 21 is a like view of the same with parts in a different position. Fig. 22 is a similar view of the same with parts in another position. Fig. 23 is a sectional side elevation of the driving-gear for the wrapping-rollers, as well as the cam for actuating various devices, the section being on the line 23 23 in Fig. 19. Fig. 24 is an enlarged cross-section of the wrapper-feed and adjacent parts. Fig. 25 is a similar view of the same with parts in a different position. Fig. 26 is an enlarged transverse section of the wrapping mechanism. Fig. 27 is a like view of the holding and cut-off device for the butt-end of the wrapper. Fig. 28 is a similar view of the same with parts in a different position. Fig. 29 is a sectional side elevation of the same on the line 29 29 in Fig. 27. Fig. 30 is a like view of part of the same, the section being on the line 30 30 in Fig. 27. Fig. 31 is a similar view of the same on the line 31 31 in Fig. 27. Fig. 32 is an enlarged transverse section of part of the main cam-wheel and part of the mechanism for the wrapper-feed. Fig. 33 is an enlarged front elevation of the cleaning devices for cleaning out the head portion of the wrapping mechanism. Fig. 34 is a like view of the same with parts in a different position. Fig. 35 is a similar view of the same with parts in another position. Figs. 36 and 37 are face views of the tracks for the apron-roller to travel on. Fig. 38 is a cross-section of the apron-roller. Fig. 39 is an enlarged sectional side elevation of the perforated table, apron, and roller. Fig. 40 is an enlarged cross-section of the wrapper-platform, the slide, and its shaft for imparting a transverse reciprocating motion to the slide. Fig. 41 is an enlarged cross-section of the head of the wrapping mechanism. Fig. 41$^a$ is a sectional plan view of the same. Fig. 42 is a plan view of a modified form of the wrapper-head support, and Fig. 43 is a cross-section of the same.

The machine presently to be described in detail consists of coacting mechanisms mounted on a suitably-constructed main frame A and driven from a main shaft B, journaled in the forward end of said frame A and having fast and loose pulleys B', B$^2$, connected by belt with other machinery for rotating the shaft B in the direction of the arrow $a'$. The several mechanisms referred to comprise a compacting device C, located at the rear portion of the frame A and which receives the tobacco in a measured quantity from a hopper D and which device C transfers the compacted tobacco to a rolling-apron E of a rolling device which rolls the tobacco and subsequently wraps a binder around the compacted filler to form a cigar-bunch, which latter after being cut off at the ends to the proper size is transferred by a transferring device F to a wrapping mechanism G, arranged on the forward end of the frame A and operating, in conjunction with a wrapper-feeding device H, a wrapper-smoothing device I, a wrapper-head cutting and securing device J for cutting the wrapper-head the proper shape and securing it in position on the cigar-bunch, a cut-off device K for cutting off surplus material from the butt-end of the wrapper, and a cleaning-brush L for cleaning the head portion of the wrapping device after a cigar is discharged.

The detail construction of the machine is as follows: The hopper D referred to is provided with a forwardly and downwardly inclined bottom D' (see Figs. 9 and 10) and with a vertically-disposed front D$^2$, terminating at its lower end a suitable distance from said bottom D' to form an outlet-opening for the loose or scrap tobacco contained in the hopper D and to be fed into the pocket C' of the compacting device C. On the upper surface of the bottom D' are arranged longitudinally-extending pushers D$^3$, preferably square in cross-section and located one alongside the other, said pushers having ratchet-teeth at their upper faces and extending through the back of the hopper, as is plainly shown in said Figs. 9 and 10. The pushers D$^3$ successively receive reciprocating movement during a little more than one half-revolution of the main shaft B to push with their lower ends the loose or scrap tobacco into the pocket C'. The outer end D$^5$ of each of the pushers D$^3$ is reduced and mounted to slide in a suitable bearing D$^6$, supported on the hopper D, and on said reduced end of each pusher is coiled a spring D$^7$, one end of which rests on the pusher proper, the other end abutting against the bearing D$^6$, so as to press the pusher D$^3$ forward into an innermost position. Each of the pushers D$^3$ is provided with a depending arm D$^8$, adapted to be engaged by a cam-arm N, projecting from a cam-shaft N', extending transversely and mounted to turn in suitable bearings carried by the main frame A. The several cam-arms N are set at an angle to one another, so that when said cam-shaft N' is rotated the cam-arms impart successively an outward movement to the pusher-arms D$^8$, so as to move the same outward against the tension of their springs D$^7$, and when said cam-arms N leave said pusher-arms D$^8$ the springs D$^7$ move the pushers inward, and the latter force the loose or scrap tobacco through the discharge-opening of the hopper into the pocket C'. By having the ratchet-teeth D$^4$ on the upper faces of the pushers D$^3$ and by successively giving a sliding motion to said pushers, as described, the tobacco in the hopper is not only gradually fed toward the lower ends of the pushers, but is also worked to cause the tobacco leaves or parts to arrange themselves so that when the tobacco is pushed into the pocket C' it extends lengthwise therein to insure the formation of a well-drawing filler and cigar. On the cam-shaft N' is also secured an eccentric D$^9$, (see Figs. 3 and 9,) engaged by an eccentric-strap D$^{10}$, pivotally connected with an arm D$^{11}$, depending from a shaft D$^{12}$, carrying a series of downwardly and forwardly extending agitating arms or prongs D$^{13}$ for agitating the loose or scrap tobacco in the hopper D during the time the pushers D$^3$ are pushing or feeding the loose or scrap tobacco into the pocket C'. It is understood that during the intermittent rotary movement of the shaft N' the eccentric D$^9$ and the eccentric-strap D$^{10}$ impart a rocking motion to the shaft D$^{12}$ by the arm D$^{11}$, so that the prongs D$^{13}$ swing up and down in the loose or scrap tobacco and agitate the same to prevent undue packing or settling of the tobacco in the hopper.

In order to give the cam-shaft N' an intermittent rotary movement from the main shaft B, one end of said shaft N' is provided with a clutch member N$^2$, (see Fig. 2,) adapted to be engaged by a clutch member N$^3$, forming part of a sprocket-wheel N$^4$, mounted to turn loosely on the shaft N' and normally in such a position that its clutch member N$^3$ is out of mesh with the clutch member N$^2$, fixed on the shaft N'. The sprocket-wheel N$^4$ is connected by a sprocket-chain N$^5$ (see Fig. 2) with a sprocket-wheel, mounted to rotate loosely on a transverse shaft N$^7$, journaled in the frame A, and on the outer face of the sprocket-wheel $N^6$ is secured or formed a sprocket-pinion $N^8$, connected by a sprocket-chain $N^9$ with a sprocket-wheel $N^{10}$, secured on one end of the shaft B. When the shaft B is rotated, a rotary motion is transmitted by the sprocket-wheel $N^{10}$ and sprocket-chain $N^9$ to the pinion $N^8$ and sprocket-wheel $N^6$, which latter in turn rotates the sprocket-wheel $N^4$ by the sprocket-chain $N^5$, and when said sprocket-chain $N^4$ is shifted on the shaft $N'$ and engages with its clutch member $N^3$ the clutch member $N^2$ then a rotary motion is given to the shaft $N^5$ and its cam-arms N to agitate the pushers and the agitator in the hopper D, as above explained.

In order to shift the sprocket-wheel $N^4$ to move its clutch member in mesh with the clutch member $N^2$, said sprocket-wheel $N^4$ is engaged by a shifting-lever $N^{11}$, fulcrumed on one side of the main frame A and having a depending slotted arm $N^{12}$, engaged by a friction-roller $O'$ (see Fig. 5) on the rear end of a lever O, fulcrumed on the shaft $N^7$, previously mentioned. The lever O extends longitudinally and its forward end (see Fig. 4) is formed into a cam $O^2$, engaged by a friction-roller $O^3$ on one face of a disk $O^4$, secured on the main shaft B, so that when said shaft is rotated an intermittent swinging motion is given to the lever $O'$ whereby the latter imparts a swinging motion to the arm $N^{12}$ of the shifting-lever $N^{11}$ to move the clutch member $N^3$ at the proper time in mesh with the clutch member $N^2$ for the purpose above described. The cam $O^2$ on the lever O has a portion segmental relatively to the shaft B, and the remaining portion is straight, as is plainly indicated in dotted lines in Fig. 4. The cam portion of said lever O is also formed with a segmental slot $O^5$, through which loosely extends the shaft B, so that the lever O is free to swing up or down by the action of the friction-roller $O^3$ in the straight part of the cam $O^2$.

The rear end of the lever O is forked, and the forked ends are pivotally connected by upwardly-extending links $C^2$ with the crossbar $C^3$ of a slide $C^4$ of the compacting device C, as is plainly indicated in the drawings. The slide $C^4$ is mounted to move vertically in suitable guideways on the outer face of the hopper-front $B^2$, (see Figs. 7 to 12,) and on the rear face of the slide $C^4$ is secured a knife or gate $C^5$ for closing the outlet-passage of the hopper D and for cutting off with the lower sharpened edge of the knife any tobacco that may partly extend into the hopper and partly into the pocket $C'$. The pocket $C'$ consists, essentially, of a swinging bottom $C^6$ and an adjustable top $C^7$, preferably made of spring metal and held on screw-rods $C^8$, screwing in suitable nuts $C^9$, carried by a pocket-carrier P, said screw-rods being under the control of the operator, so that by adjusting the screw-rods the top $C^7$ is bent the desired shape to be given to the pocket $C'$, the form of which changes according to the ultimate shape to be given to the cigar. The pocket-carrier P is likewise mounted to slide vertically in suitable guideways carried by the hopper D and has an independent sliding movement from the slide $C^4$, but on the front face thereof.

The pocket-carrier P is actuated from the slide $C^4$, and for this purpose the following device is provided: On the sides of the pocket-carrier P (see Fig. 11) are formed recesses $P'$, engaged by the lower ends of bell-crank levers $P^2$, fulcrumed on the front face of the slide $C^4$ and having their upper ends provided with longitudinally-extending pins $P^3$, passing loosely through segmental slots $C^{10}$ in the slide $C^4$ to extend into cam-grooves $P^4$, formed on the outer face of the hopper-front $D^2$, as shown in Fig. 12. Each of the cam-grooves $P^4$ is provided with a pivoted shoe $P^5$ for changing the direction of the pins $P^3$ and governing thereby the swinging movement of the bell-crank levers $P^2$. Each cam-groove $P^4$ has an upper outwardly-curved part $P^6$, through which travels a pin, forced downward to the vertical part $P^7$ of the groove $P^4$, to finally move in contact with the lower end of the shoe $P^5$ and swing the same over to the position shown in dotted lines in Fig. 12, it being understood that this movement of the pin $P^3$ takes place during the downward movement of the slide $C^4$. When the pin $P^3$ reaches the lower end of the part $P^7$, then the weight of the carrier on the bell-crank levers will cause the same to swing so as to move the pins $P^3$ outwardly along the segmental bottom portion $P^8$ of the groove $P^4$, and when the slide $C^4$ now rises then the pin $P^3$ travels upward in the straight portion $P^9$ of the groove $P^4$ and moves into the inwardly and upwardly inclined portion $P^{10}$, so that a swinging movement is given to each bell-crank lever to move the carrier P for the time being on the upwardly-moving slide, so that the carrier travels faster than the slide. When the pin $P^3$ has reached the upper end of the inclined part $P^{10}$, it is guided into the segmental part $P^6$ and then swings outward, so that the carrier now remains stationary in its guideways, while the slide $C^4$ still moves farther upward into an uppermost position. By the arrangement described the pocket-carrier P during the first portion of the downward movement of the slide $C^4$ remains stationary, then travels with the slide $C^4$ to a lowermost position, and during the upward movement of the slide $C^4$ the carrier remains first stationary, then travels with the slide, to then travel faster upward on the slide, and, finally, remain stationary during the last portion of the upward movement of the slide $C^4$.

During the time the tobacco is filled into the pocket $C'$ the bottom $C^6$ is in a lowermost position; but the bottom $C^6$ is hinged at $C^{11}$ to the pocket-carrier and swings open at the time the slide $C^4$ moves into a lowermost position to drop the measured quantity of the compacted tobacco upon the apron E, as is plainly shown in Fig. 10. When the slide $C^4$ moves upward and immediately previous to the knife $C^5$ opening the outlet-passage of the hopper D, the said bottom $C^6$ swings back into a closed position, so as to again complete the pocket $C'$ preparatory to receiving another charge of tobacco from the hopper D.

In order to accomplish the desired movement, the bottom $C^6$ is provided on its ends with upwardly-extending rods $C^{12}$, each having its upper end formed with a lug $C^{13}$, adapted to alternately engage pins $C^{14}$ $C^{15}$, projecting forwardly at the front of the hopper D. (See Figs. 7 and 8.) When the slide $C^4$ nears its lowermost position, then the lugs $C^{13}$ move in contact with the fixed pins $C^{15}$ to swing the bottom $C^6$ into the open position shown in Fig. 10 on the further downward movement of the slide $C^4$ to a final position. When the slide $C^4$ moves upward and with it the carrier P and pocket $C'$, then the lugs $C^{13}$ finally come in contact with the pins $C^{14}$, so that during the final upward movement of the pocket-carrier P the bottom $C^6$ is swung into a closed position as the rods $C^{12}$ are held against movement by their lugs $C^{13}$ abutting against the pins $C^{14}$. The several devices connected with the compacting device are so timed that while the knife $C^5$ is in an open position and the members of the pockets $C'$ are closed, as shown in Fig. 9, the pushers $D^3$, as well as the prongs $D^{13}$, are in motion and fill the pocket $C'$ with the desired quantity of tobacco, and when this has been done the slide $C^4$ moves downward, so that the knife $C^5$ cuts off the hopper D from the said pocket $C'$, and the tobacco in said pocket is moved to the apron E, at which time the bottom $C^6$ automatically swings into an open position to allow the measured quantity of tobacco to drop upon the said apron. (See Fig. 10.) The slide $C^4$ now again rises, and previous to the knife $C^5$ uncovering the hopper-outlet the bottom $C^6$ again swings into a lowermost position, the inner edge of the bottom abutting against the front end of the hopper-bottom $D'$, as shown in Fig. 9. When the knife $C^5$ has finally opened the hopper-outlet, then the pushers $D^3$ and the prongs $D^{13}$, which were inactive during the last part of the above-described operation, are again actuated, so that the pocket $C'$ is refilled with another measured quantity of tobacco. In order to hold the rods $C^{12}$ in proper vertical position, the lugs $C^{13}$ are extended inwardly into vertical grooves $C^{16}$, formed in the sides of the carrier P, as is plainly shown in Fig. 4. A spring $C^{17}$ presses each rod $C^{12}$, so as to hold the rods, and consequently the bottom $C^6$, in either an open or closed position until the lugs $C^{13}$ are acted upon by the pins $C^{14}$ $C^{15}$ for the purpose above described.

When the pocket $C'$ moves into a lowermost position, as shown in Fig. 10, it presses on the apron E, and thereby moves a portion thereof downward to form a pocket in a recess $E'$ in the top of a table $E^2$, held stationary in the main frame A, the table having its forward portion formed with perforations $E^3$, opening at the bottom into a suction-chamber $E^4$, connected by a pipe $E^5$ with a suction-fan or other similar machine used to create suction in the chamber $E^4$ to draw the apron E firmly down upon the forward portion of the table $E^2$ for the purpose hereinafter more fully described.

The forward end of the apron E is rigidly secured to the extreme forward end of the table $E^2$, and said apron extends over the roller $E^6$ of the rolling device, said roller being made in sections, mounted to rotate loosely on a shaft $E^7$, held at its ends in levers $Q'$, (see Figs. 13, 14, 15, and 16,) fulcrumed on a carriage Q, mounted to reciprocate in suitable guideways $A'$, formed on the main frame A. The sections of the roller $E^6$ are so constructed and arranged that they form a concave rear side, as is plainly indicated in Fig. 38, and the sections are held in place on the shaft $E^7$ by suitable collars $E^8$, attached to said shaft. The ends of the shaft $E^7$ extend into longitudinally-extending cam-grooves $A^2$ $A^3$, (see Figs. 36 and 37,) somewhat different in shape, to impart a different up-and-down movement to the ends of the shaft $E^7$ to insure the proper formation of the filler and cigar-bunch during the rolling process, as hereinafter more fully described.

In front of the roller $E^6$ is arranged a roller $E^9$, journaled on a carriage Q and serving to hold the apron against said roller $E^6$, as will be readily understood by reference to Figs. 9 and 10. The apron E also passes over a fixed transversely-extending rod or roller $E^{10}$, supported from the bottom $D'$ of the hopper D, the apron at its rear end being attached to a shaft $E^{11}$, journaled in the upper forked end of a lever $E^{12}$, fulcrumed at $E^{13}$ on the main frame A and having a forwardly-extending cam-slot $E^{14}$, engaged by a pin $R'$ of a lever R, fulcrumed at its lower end on the main frame A and pivotally connected at its upper end by links $R^2$ with the carriage Q to impart a reciprocating movement to the latter. The shaft $E^{11}$, carrying the rear end of the apron E, is provided with an adjusting and locking mechanism in the form of a ratchet-wheel and pawl $E^{15}$ (see Figs. 13 and 14) to permit the operator to give the desired tension to the apron by winding up or unwinding the rear end of the apron on said shaft $E^{11}$ for the purpose.

The rocking lever R is pivotally connected by its pin $R'$ with a cam-link $R^3$, formed at its forward portion with an elongated slot $R^4$, (see Figs. 20, 21, and 22,) the walls of which are mounted to travel loosely on an antifriction-roller $B^3$, held on the shaft B. The forward end of the cam-link $R^3$ is provided with two cam-grooves $R^5$ $R^6$, adapted to be successively engaged by an antifriction-roller $R^7$ on the face of the disk $O^4$, above described. When the shaft B and the disk $O^4$ rotate in the direction of the arrow $a'$ and the antifriction-roller $R^7$ engages the cam-groove $R^6$, then a forward sliding movement is given to the cam-link $R^3$ to impart a forward swinging movement to the lever R, and thereby pull the carriage Q forward at the time the slide $C^4$ is moving into an uppermost position—that is, after the compacted filler has been dropped by the pocket $C'$ upon the apron E at the recess $E'$. (See Fig. 10.) When the roller $R^7$ leaves the upper end of the cam-groove $R^6$, then the carriage Q is at the end of its forward stroke, as shown in Fig. 21, and said carriage remains temporarily stationary—that is, during the time the roller $R^7$ travels across the slot $R^4$ into the groove $R^5$—and then the action of the roller $R^7$ on the walls of the groove $R^5$ is such as to move the link $R^3$ backward to impart a rocking motion to the lever R, whereby the carriage Q is returned and moved into the rearmost position under the hopper D, as shown in Fig. 4. The cam-link $R^3$ is preferably made in sections adjustably secured together, as indicated in Figs. 4, 10, and 21, to permit of adjusting the parts to compensate for wear on the roller $R^7$ and the cam-grooves $R^5 R^6$.

During the forward swinging movement of the lever R the pin $R'$ imparts a rocking movement to the lever $E^{12}$, to which the end of the apron E is attached by the shaft $E^{11}$, as above explained. The rocking motion given to the lever $E^{12}$ by the pin $R'$ engaging the slotted end $E^{14}$ is for the purpose of slackening and tightening the apron E during the rolling process, the apron E being first slackened to permit of forming a pocket in the apron for receiving the compacted filler, then tightened for closing the pocket and for keeping the apron tightly stretched over the perforated part of the table $E^2$, and for finally drawing the apron E still tighter to discharge the finished cigar-bunch into the transferring device F at the time the carriage Q is at the end of its forward stroke. (See Fig. 21.)

The carriage Q is provided with a device for successively closing the perforations $E^3$ on the table $E^2$ as the carriage moves forward to release the apron E during the forward movement of the carriage Q and to again uncover said perforations $E^3$ during the return movement of the carriage to cause the apron to be sucked down upon the perforate portion of the table by the air exhausted from the chamber $E^4$. This device for closing and opening the perforations $E^3$ consists, essentially, of plates $Q^2$, attached to brackets $Q^3$, held vertically adjustable on the carriage Q, as is plainly shown in Figs. 9 and 10. A roller $Q^4$, extending transversely and journaled in the sides of the carriage Q, serves to form a support for the apron E during the return movement of the carriage to allow the air to quickly suck the apron upon the perforated part of the table without undue friction upon the apron sliding over the said roller $Q^4$.

In order to hold the binder in position on the apron E, (see Figs. 13 and 14,) said apron is provided near one edge with an opening $E^{17}$, adapted to register with one of the perforations $E^3$, so that this end of the binder is held upon the apron by suction. When the rollers $E^9$ and $E^6$, however, have moved forward to engage said end of the binder, (see Fig. 14,) then a finger S moves upon the top of the binder and positively holds the same in position on the apron during the rolling in of the tobacco by the binder, said finger moving with the carriage Q forward and backward, and at the same time a transverse up-and-down swinging movement is given to the finger S to move the same in or out of contact with the binder, as presently to be described in detail.

The finger device S is provided with a head $S'$, (see Fig. 18,) loosely engaging the free end of a lever $S^2$, a spring $S^3$ pressing the outer face of the said head $S'$ to hold the finger in position on the lever $S^2$, but at the same time allow the finger S to swing with the head $S'$ as the fulcrum. The lever $S^2$ is fulcrumed on a slide $S^4$, mounted to move longitudinally in a suitable guideway $Q^5$, curved upwardly at its front end and formed on one side of the carriage Q, and on the fulcrum end of the lever $S^2$ is formed or secured a pin $S^5$, extending transversely and loosely through an opening in the slide $S^4$ and projecting into a cam-slot $S^6$ in a link $S^7$, pivotally connected with the slide $S^4$ by a screw $S^8$ and with a segmental gear-wheel $S^9$, fulcrumed on the carriage Q. (See Figs. 13, 14, 15, 16, and 17.) The teeth of the segmental gear-wheel $S^9$ are irregular and are adapted to be engaged by two sets of pins or teeth $S^{10} S^{11}$, secured on the side of the main frame A adjacent to that part of the carriage Q carrying the finger device, said pins $S^{10} S^{11}$ being located at different planes, as is plainly indicated in Fig. 15, and the pins in each set being arranged longitudinally, but spaced irregular distances apart. When the carriage Q is in a rearmost position, as illustrated in Figs. 1 and 13, then the finger S is in its normal position located at one side of the apron E, said finger extending transversely above the level of the apron E. (See Figs. 7 and 8.) When the carriage Q moves forward and the rollers $E^9 E^6$ approach the rear end of the binder, placed in a diagonal direction on the apron E, then the lowermost tooth of the segmental gear-wheel $S^9$ engages the rearmost of the pins $S^{10}$, so that a turning movement is given to the gear-wheel, and the latter by the link $S^7$ moves the slide $S^4$ rearwardly and downwardly, and as the link $S^7$ assumes an angular position it is evident that the walls of the cam-slot $S^6$ impart a swinging motion to the pin $S^5$ and its lever $S^2$ to move the finger S over and down upon the binder and hold the same in position on the apron E. During the further forward movement of the carriage Q the rearmost pin $S^{10}$ leaves the lowermost tooth, and now the middle tooth of the gear-wheel $S^9$ moves in contact with the following pin $S^{10}$, so that said gear-wheel $S^9$ is again turned, whereby a further rearward sliding movement is given to the slide $S^4$ and the finger S remains stationary on the binder for the time being, while the carriage Q moves forward with its rollers $E^9$ $E^6$. During the wrapping of the rear end of the binder around the filler of tobacco the finger S swings around with the filler, so as to hold said rear end of the binder firmly in position during the wrapping operation, and as soon as said rear end has been wrapped around the filler the third tooth of the gear-wheel $S^9$ moves in contact with the forward pin $S^{10}$, so that a further turning movement is given to the gear-wheel $S^9$, and as the pivotal end of the link $S^7$ has now passed the central position it is evident that the pin $S^5$ in the cam-groove $S^6$ imparts a swinging movement to the lever $S^2$ in an outward direction, so that said pin S is withdrawn from the binder and the filler. During the rest of the forward movement of the carriage Q the finger S remains in this outermost withdrawn position, and on the return stroke of the carriage Q the segmental gear-wheel $S^9$ comes with its teeth successively in contact with the uppermost row of pins $S^{11}$, so that the slide $S^4$ is returned to its forward position, (shown in Fig. 15,) and whereby an upward movement is given to the lever $S^2$ to bring the finger S again in proper position at one side and above the apron E, as previously explained, so that on the next forward movement of the carriage Q the finger can again pass in contact with the binder on the apron E, as above explained.

The transferring device F, into which the complete bunch is discharged by the apron E and which transferring device carries the bunch over to the wrapping mechanism G, is constructed in detail as follows: The transferring device F is provided with a pocket for receiving the bunch from the apron, and this pocket consists, essentially, of three plates $F'$ $F^2$ $F^3$, of which the plate $F^2$ is movable toward and from the plate $F'$ to open or close the pocket, and said plate $F^3$ is movable between the plates $F'$ $F^2$ to form the bottom for the pocket (see Figs. 20, 21) and to push the bunch out of the pocket and discharge it into the wrapping mechanism G, as shown in Fig. 22. The plate $F'$ is fixed to a lever $F^4$, secured on a shaft $F^5$, extending transversely and journaled in suitable bearings in the main frame A, and on this shaft is secured a segmental gear-wheel $F^6$, (see Figs. 4, 20, 21, and 22,) in mesh with a segmental gear-wheel or rack $F^7$, mounted to turn loosely on a cross-bar $A^5$ of the main frame, and said segmental rack $F^7$ is connected by a link $F^8$ with the cam end of the lever O, previously mentioned and used for manipulating the compacting device C, as above explained. When a swinging motion is given to the lever O, as above described, then the link $F^8$ imparts a swinging motion to the segmental gear-wheel $F^7$ to turn the gear-wheel $F^6$ and the shaft $F^5$, so that a swinging motion is imparted to the lever $F^4$ to swing the latter, so that the pocket moves from the receiving position (shown in Figs. 20 and 21) into the discharge position (shown in Fig. 22) and back to its receiving position during one revolution of the main shaft B and the cam-disk $O^4$, which latter actuates the lever O. The other plate $F^2$ is pivoted at $F^9$ on the forward end of the lever $F^4$, and from this pivot extends rearwardly an arm $F^{10}$, connected by a short link $F^{11}$ with one end of a lever $F^{12}$, fulcrumed at $F^{13}$ on the lever $F^4$, between the fulcrum of the latter and the plate $F'$, as is plainly shown in Figs. 20, 21, and 22. The lever $F^{12}$ is extended beyond its fulcrum into a cam end $F^{14}$, adapted to be engaged by a double-armed lever $F^{15}$, fulcrumed on the main frame and adapted to be engaged by cam-lugs $F^{16}$ $F^{17}$ on the peripheral surface of the cam-disk $O^4$, so that when the shaft B is rotated and a rotary motion is given to the disk $O^4$ then the lugs $F^{16}$ $F^{17}$ alternately impart a swinging motion to the lever $F^{15}$ to impart a swinging motion to the lever $F^{12}$ and move the plate $F^2$ alternately into a closed or open position, as previously mentioned, by the action of the knuckle-joint, consisting of the lever $F^{12}$, link $F^{11}$, and arm $F^{10}$. The swinging motion of the lever $F^{12}$ is limited by the walls of a segmental or elongated slot $F^{18}$, formed in the cam end $F^{14}$, the shaft $F^5$ extending through said slot for the purpose mentioned. As shown in Fig. 20, the pocket of the transferring device is open to receive the bunch, and when the disk $O^4$ is turned to the position shown in Fig. 21 then the lug $F^{16}$ has actuated the lever $F^{15}$, so that the plate $F^2$ is moved into a closed position to hold the bunch in position in the pocket. The pocket remains closed until the transferring device has reached the position shown in Fig. 22, and then the other lug $F^{17}$ imparts a swinging motion to the lever $F^{12}$ to cause the plate $F^2$ to move into an open position, as shown in Fig. 22. It is understood that when either in an open or closed position the lever $F^{12}$ and connected parts remain stationary, owing to the knuckle-joint connection between the lever $F^{12}$ and the plate $F^2$. The other plate $F^3$ is secured on a lever $F^{19}$, fulcrumed on the pivot $F^{13}$, and the lever $F^{19}$ is extended to form the cam end $F^{20}$, likewise adapted to be engaged by the lever $F^{15}$, which actuates the cam end $F^{14}$ of the lever $F^{12}$. A spring $F^{21}$ presses the lever $F^{19}$, so as to hold the latter normally in a bottom position, (shown in Figs. 20, 21,) it being understood that the swinging motion of the lever $F^{19}$ is limited by the shaft $F^5$, extending through an elongated slot in the cam end $F^{20}$ of said lever. When the lever $F^4$ receives a swinging motion, as above described, it is evident that the levers $F^{12}$ $F^{19}$, pivoted on said lever $F^4$, move with the latter, and at the same time an independent swinging motion is given to the levers $F^{12}$ $F^{19}$ by the action of the lever $F^{15}$, so that the plate $F^2$ moves into an open or closed position, as previously described, and the plate $F^3$ is moved downward to positively discharge the bunch from the pocket at the time the pocket is over the wrapping mechanism G, as shown in Fig. 22. When the lever $F^4$ swings backward from the position mentioned, then the lever $F^{15}$ in releasing the cam end $F^{20}$ allows the spring $F^{21}$ to immediately return the lever $F^{19}$ to its former position, so that the plate $F^3$ occupies its bottom position in the pocket of the transferring device.

The ends of the bunch are cut off while in the pocket of the transferring device F and while said pocket is still at rest at the end of the table $E^2$. (See Fig. 10.) This cutting device consists of two fixed knives T, located at the ends of the transferring-device pocket, each knife T being secured on the cross-bar $A^5$, and on each knife is fulcrumed a swinging knife T', operating in conjunction with its corresponding stationary knife to cut off the ends of the bunch projecting beyond the plates F' $F^2$ $F^3$ of the pocket in which the bunch is contained. Each of the movable knives T' is provided with a fork $T^2$, adapted to be engaged by a cross-bar $R^8$, connecting the lever R with the links $R^2$ for actuating the carriage Q. When the lever R is in a rearmost position, as shown in Fig. 10, the forks $T^2$ are locked in place in spring-catches $T^3$, carried on the under side of the chamber $E^4$, the knife T' being then in a closed position. When the lever R swings forward, the cross-bar $R^8$ engages the forks $T^2$ and swings the same downward, so as to open the knives T' at the time the carriage Q, with the rolling device, moves into a forward position, it being understood that the knives are completely open at the time the bunch is dropped into the pocket of the transferring device. When the carriage returns by the lever R swinging rearwardly, then the forks $T^2$ are swung upward, so that the knives T' close, and thereby cut off the projecting ends of the bunch immediately previous to the lever $F^4$ receiving a forward swinging motion for transferring the cut-off bunch to the wrapping mechanism G. During the rearward swinging movement of the lever R the forks $T^2$ are moved in engagement with the spring-catches $T^3$ at the time the cross-bar $R^8$ leaves the forks $T^2$, so that the latter are held in this position by the spring-catches until the cross-bar $R^8$ returns on the next forward movement of the lever R. The fixed knives T have rearwardly-extending supporting-arms $T^4$ for supporting the forward end of the table $E^2$ and its suction-chamber $E^4$, the rear portion of the table $E^2$ being adjustably supported by a depending slotted arm $E^{16}$ from a rear cross-bar $A^6$ of the main frame A. (See Figs. 5, 7, 8, and 9.)

The wrapping mechanism G is in many respects similar to the one shown and described in the Letters Patent of the United States, No. 617,366, for a cigar-machine and granted to us on January 10, 1899. The wrapping mechanism G consists, essentially, of rollers G' $G^2$ $G^3$ $G^4$ $G^5$, similar in construction to the corresponding rollers shown and described in the patent above referred to, so that further detail description of these rollers is not deemed necessary. The rollers G' $G^2$ $G^3$ are journaled in stationary bearings carried by the main frame, while the rollers $G^4$ $G^5$ are journaled in arms $G^6$, secured to a shaft $G^7$, extending transversely and journaled in suitable bearings in the main frame A. On the shaft $G^7$ is secured a depending arm $G^8$, carrying on its free end a friction-roller $G^9$, engaging the innermost cam-groove U' of a cam-wheel U, secured on the main shaft B and rotating with the same. (See Fig. 23.) The rollers G' $G^2$ $G^3$ $G^4$ $G^5$ form a transverse pocket for receiving the bunch from the pocket of the transferring device F at the time the rollers $G^4$ $G^5$ are in an outermost position, as shown in Fig. 22, the said rollers $G^4$ $G^5$ moving into an innermost or closed position after the delivery of the bunch by the transferring device F, so that the pocket formed by the rollers is closed and the rollers are in firm contact with the peripheral surface of the bunch to roll the same into proper shape and to turn the bunch during the following operation of drawing the wrapper around the bunch. When the rollers $G^4$ $G^5$ are in a closed position, all the rollers are rotated in unison, and for this purpose the several rollers are provided with pinions $G^{10}$, (see Fig. 23,) in mesh with a central gear-wheel $G^{11}$, secured on a shaft $G^{12}$, journaled in suitable bearings in the main frame A and carrying a pinion $G^{13}$, in mesh with a gear-wheel $U^2$, forming part of the rim of the cam gear-wheel U, as is plainly shown in Fig. 19.

The wrapper to be wrapped around the bunch in the pocket of the wrapping mechanism G is placed by the operator over a platform H', fixed to the front cross-bar $A^9$ of the main frame A, the wrapper also extending rearwardly upon a movable platform $H^2$, extending with its forward portion under the fixed platform H' to be hinged to the cross-bar $A^9$, as above mentioned. The movable platform $H^2$ is formed with a cam-slot $H^3$, engaged by a pin $H^4$, secured to a slide $H^5$, mounted to move transversely on a shaft $H^6$ and a shaft V, both journaled in suitable bearings in the main frame A. The shaft $H^6$ is formed with a double spiral groove $H^7$ for a portion of its length, and this groove $H^7$ is engaged by a shoe $H^8$, (see Fig. 40,) carried by the slide $H^5$, so that when the shaft $H^6$ is rotated the said shoe travels in the double spiral groove $H^7$ forward and backward to impart a transverse sliding movement to the slide $H^5$, whereby the pin $H^4$ imparts a swinging motion to the movable platform $H^2$ to give the desired inclination to the wrapper for winding the same in a spiral direction around the bunch in the pocket formed by the rollers G' G² G³ G⁴ G⁵. The shaft H⁶ is intermittently rotated, and for this purpose a pinion H⁹ is mounted to rotate loosely and slide transversely on one outer end of the shaft H⁶, and in the outer face of the said pinion is a clutch member H¹⁰, adapted to engage a corresponding clutch member H¹¹ on the outer end of the shaft H⁶. The pinion H⁹ is at all times in mesh with the gear-wheel U² of the cam-wheel U (see Fig. 1) and is formed with an annular groove H¹², engaging a cam-ridge U³ on the peripheral surface of the cam-wheel U. When the shaft B, and with it the cam-wheel U, is rotated, then the pinion H⁹ is rotated, and when the cam-ridge U³ shifts the pinion H⁹ outwardly to bring the clutch members H¹⁰ H¹¹ in mesh then the shaft H⁶ is rotated and a transverse movement is given to the slide H⁵, so that the platform H² is swung forward; but under the fixed platform H' during the travel of the shoe H⁸ in the forward portion of the groove H⁷, and when the platform H² is in this position, as shown in Fig. 19, then the pinion H⁹ is temporarily shifted inward by the ridge U³ to stop the rotation of the shaft H⁶ for the time being, after which the pinion H⁹ is again moved outward by the ridge U³, so that a further rotation is given to the shaft H⁶, and the shoe H⁸ now travels in the return portion of the groove H⁷, so that the slide H⁵ is returned to its original position (shown in Fig. 1) and in doing so imparts a return swinging motion to the platform H². It is understood that this return movement of the slide H⁵ and the platform H² takes place after the wrapper has been wrapped around the bunch.

In order to hold the rear end of the wrapper in position on the swinging platform H², a brush H¹³ is provided controlled by the smoothing device I, as hereinafter more fully described. The brush H¹³ has a spring-handle secured to the free end of an arm H¹⁴, fulcrumed on the platform H², and said brush is adjusted by set-screws H¹⁵ (see Fig. 24) to regulate the tension with which the brush presses on the wrapper. The arm H¹⁴ (see Fig. 19) is provided near its fulcrum end with lugs H¹⁶, adapted to engage stop-lugs H¹⁷ H¹⁸ to limit the swinging movement of the brush-arm H¹⁴, said stop-lugs H¹⁷ H¹⁸ being formed on the platform H².

In order to hold the brush-arm H¹⁴, and with it the brush H¹³, in an uppermost position, as shown in Fig. 24, for conveniently placing the wrapper in position on the platform H², the fulcrum end of the arm H¹⁴ is provided with a pin or lug H¹⁹, pressed on by a spring H²⁰, attached to the platform H². The pivot of the arm H¹⁴ is provided with an extension-arm H²¹, adapted to be engaged by the smoothing device I, so as to impart a downward swinging motion to the brush H¹³ immediately previous to the platform H² beginning its forward swinging motion—that is, after the wrapper has been placed in position on the platforms H' H² the brush H¹³ remains in contact with the wrapper during the time the latter is fed upon the bunch—and upon the beginning of the return movement of the slide H⁵ and platform H² the brush is returned to its uppermost position. (Shown in Fig. 24.)

The smoothing device I (see detail, Figs. 19, 21, 24, and 25) consists, essentially, of two revoluble brushes I' I², arranged one alongside the other and one somewhat in front of the other, as is plainly indicated in Fig. 19, said brushes being adapted to pass with their lower edges into the pocket of the wrapping device between the top rollers G' G⁵, as indicated in Fig. 21. The front brush I' is set somewhat at an angle to the brush I², which latter extends transversely, as shown in Fig. 21. The brushes I' I² have their shafts journaled on an arm I³, fulcrumed at I⁴ on the slide H⁵, and said arm is adapted to swing up and down, so as to move the brushes I' I² in proper position relatively to the rollers G' G⁵ of the pocket of the wrapping mechanism. The swinging motion of the arm I³ is limited by a lug I⁵ on the arm engaging corresponding shoulders I⁶ on the slide H⁵. (See Figs. 24 and 25.) From the fulcrum end of the arm I³ extends downwardly a segmental gear-wheel I⁷, adapted to mesh with segmental racks I⁸ I⁹, pivoted on the top of a shaft I¹⁰, held from rotation in the main frame A, but mounted to slide transversely thereon. The segmental racks I⁸ I⁹ are pressed at their free ends in an upward direction by springs I¹¹, (see Fig. 25,) so that the free ends of said segmental racks are somewhat raised to mesh with the segmental gear-wheel I⁷ at the time the latter moves toward the free end of a segmental rack, the racks extending in opposite directions from their pivotal ends, as is plainly indicated in Fig. 25.

The forward end of the shaft I¹⁰ is formed on its under side with a notch I¹², engaging a cam-ridge U⁴ on the peripheral surface of the cam-wheel U, so that when the latter is rotated said cam-ridge U⁴ imparts a transverse sliding motion to the shaft I¹⁰, so as to bring the segmental racks I⁸ I⁹ in proper position for actuating the arm I³ for throwing the same downward at the proper time and for swinging the arm back into an uppermost position. The arm I³ is adapted to engage the arm H¹⁴ of the wrapping device previously described, and as it is essential for the brush H¹³ to swing downward on the head of the wrapper before the platform H² is caused to swing it is necessary that a downward swinging motion be given to the arm I³ previously to the slide H⁵ beginning its transverse movement. This is done by the shaft I¹⁰ being moved in the direction of the cam-wheel U, so that the rack I⁸ imparts a swinging motion to the segmental gear-wheel I⁷ to swing the arm I¹³ downward, and the latter in doing so presses with a cam-arm I¹³ against an arm H²¹ to swing the brush-arm H¹⁴ beyond its vertical central position, so that the weight of the brush, aided by a spring $H^{20}$, causes a final downward swinging movement of the brush-arm to move the brush $H^{13}$ in engagement with the wrapper. The final downward swinging movement of the arm $I^3$ is, however, not completed until the slide $H^5$ begins its transverse movement, when the segmental gear-wheel $I^7$ is carried along and rolls over the now stationary segmental gear-wheel $I^8$, thereby causing the arm $I^3$ to swing to a final downward position. During the further transverse movement of the slide $H^5$ the rack $I^7$ glides over the spring-pressed pivot-rack $I^9$ without being actuated by the latter; but previously to the return movement of the slide $H^5$ a transverse sliding movement is given to the shaft $I^{10}$ by the cam-reach $U^4$ in a direction away from the cam-wheel, so that the rack $I^9$ imparts a turning movement to the segmental gear-wheel $I^7$ to start the arm $I^3$ on its upward swinging movement. On the following return stroke of the slide $H^5$ the segmental gear-wheel $I^7$ rolls off on the rack $I^9$, so that a final upward swinging movement is given to the arm $I^3$. After the gear-wheel $I^7$ has disengaged the rack $I^9$ it glides over the rack $I^8$, so that the final uppermost position of the arm $I^3$ is not disturbed at this time, but the rack $I^8$ remains in position, and during the next sliding movement of the shaft $I^{10}$ in the direction of the cam-wheel $U$ a downward swinging movement of the arm $I^3$ is caused, as above described. It is understood that after the brush has been started on its downward movement by the cam-arm $I^{13}$ the brush is free from the arm $I^3$ during the forward swinging movement of the platform $H^2$; but on the return swinging movement of said platform the extension-arm $H^{21}$ passes into a fork of the arm $I^3$, so that when the latter swings upward it imparts an upward swinging motion to the brush-arm $H^{14}$, whereby the latter is moved back to its uppermost position, in which it is held by the spring $H^{20}$, pressing the lug $H^{19}$. The brushes $I'$ $I^2$ carry on their shafts $I^{14}$ $I^{15}$ (see Figs. 2 and 4) bevel-gears $I^{16}$ $I^{17}$, in mesh with bevel gear-wheels $I^{18}$ $I^{19}$, attached to a shaft $I^{20}$, mounted to turn in suitable bearings on the front end of the arm $I^3$, and the bevel gear-wheel $I^{19}$ is also in mesh with a bevel gear-wheel $I^{21}$, secured on a shaft $I^{22}$, likewise journaled on the arm $I^3$ and carrying a bevel gear-wheel $I^{23}$. The bevel gear-wheel $I^{23}$ is adapted to move into mesh at the time the arm $I^3$ reaches a lowermost position with a bevel gear-wheel $I^{24}$, (see Figs. 19 and 21,) secured on the upper end of a shaft $I^{25}$, mounted to turn in suitable bearings carried by the slide $H^5$. On the lower end of the shaft $I^{25}$ is secured a bevel gear-wheel $I^{26}$, in mesh with a bevel gear-wheel $I^{27}$, (see Fig. 40,) mounted to turn with and to slide on the shaft $H^6$, so that when the latter is rotated a rotary motion is given to the bevel gear-wheels $I^{27}$ and $I^{26}$, to the shaft $I^{25}$, and to the bevel gear-wheel $I^{24}$, and when the arm $I^3$ is in a lowermost position, as shown in Fig. 21, then the rotary motion of the gear-wheel $I^{24}$ is transmitted to the gear-wheel $I^{23}$ and the shaft $I^{22}$, which in turn, by the gearing above mentioned and located at the front end of the arm $I^3$, imparts a rotary motion to the brushes $I'$ $I^2$, but in such a manner that the brushes rotate in opposite directions. As the arm $I^3$ is carried transversely by the slide $H^5$, and as during this time the arm is in a lowermost position, it is evident that the brushes are moved bodily in a transverse direction and are rotated at the same time in opposite directions and follow the wrapper immediately after the same has been wrapped around the bunch, so that the brushes $I'$ $I^2$ cause the wrapper to lie perfectly flat and smoothly and firmly on the bunch-binder to insure an extremely fine wrapping of the cigar. When the slide $I^5$ has reached the end of its transverse movement and the brushes $I'$ $I^2$ have accomplished their work, then the shaft $I^{10}$ begins its transverse movement, so that the rack $I^9$ starts the arm $I^3$ on its upward movement—that is, swings the arm $I^3$ sufficiently upward to move the brushes $I'$ $I^2$ out from between the rollers $G'$ $G^5$. On the return movement of the slide $H^5$ the arm $I^3$ is moved to a final uppermost position, as above mentioned.

The butt-end of the wrapper is extended beyond the front end of the fixed platform $H'$, over the beginning end of the upper pocket-rollers $G'$ $G^5$, and over a fixed support $H^{22}$, carried by a rod $H^{23}$, secured to one of the arms $G^6$ to swing with the same, the said support $H^{22}$ extending over the outermost roller and having an upwardly-projecting lug $H^{24}$ near one end to form an abutment for the outside edge of the wrapper. When the wrapper is placed in position, the operator extends the butt-end of the wrapper over the support $H^{22}$ to the platform $H'$, so that the head end of the wrapper finally rests on the outer end of the swinging platform $H^2$. (See dotted lines in Fig. 1.) The butt-end of the wrapper also extends under a finger $V'$, which serves to press the butt-end of the wrapper downward between the rollers $G'$ $G^5$ into the pocket containing at the time the bunch, so that during the turning of the bunch by the rollers the wrapper moves with the rotating bunch, and consequently begins to be wrapped around the same. When the butt-end of the wrapper has thus been wrapped around the bunch, the finger moves out of engagement with the wrapper to allow the cutting device $K$ to cut off the surplus material from the butt-end of the wrapper and bring said butt-end in alinement with the butt-end of the bunch previously cut off by the knives $T$ $T'$. The finger $V'$ has a turning, a forward-and-backward, and a swinging movement, and in order to give the desired movement to the finger $V'$ the following device is provided.

The finger $V'$ is arranged in alinement with the reduced inner end $G^{14}$ of the shaft $G^{12}$, (see Figs. 26 to 32,) and the outer end of said finger V' is secured on a ring $V^2$, mounted to swing by pivots $V^3$ on a sleeve $V^4$, mounted to slide loosely on the reduced end $G^{14}$ of the shaft $G^{12}$. The finger V' is adapted to swing into an approximately parallel position to said shaft $G^{12}$ and then engage a notch $V^5$ on the sleeve $V^4$ and a notch $G^{15}$ on the shaft end $G^{14}$, so that when the latter is rotated the walls of the notch $G^{15}$ carry the finger V' along, the finger turning with the bunch rotated by the rollers $G'$ $G^2$ $G^3$ $G^4$ $G^5$, driven from the wheel $G^{11}$ on said shaft $G^{12}$. The ring $V^2$ is formed with an external annular groove engaged by a shifting and turning ring $V^6$, attached on the end of a rod $V^7$, mounted to turn in a bearing $V^8$, attached to the shaft V, having a transverse sliding motion in the main frame A, as previously mentioned. On the rod $V^7$ is secured a depending arm $V^9$, engaged by an arm $V^{10}$ on a rod $V^{11}$, mounted to slide centrally in the shaft V, a spring $V^{12}$ pressing against the inner end of the rod $V^{11}$, so as to firmly hold the forward end thereof in engagement with a cam-ridge $U^5$ on the inner surface of the rim of the cam-wheel U, as is plainly shown in Fig. 32. The end $V^{13}$ of the shaft V engages a cam-ridge $U^6$, likewise formed on the cam-wheel U, so that when the latter is rotated a sliding movement in a transverse direction is given to the shaft V and a similar movement to the rod $V^{11}$. The transverse movement of the shaft V causes a bodily forward-and-backward movement in a transverse direction of the finger V', owing to the connection above described—that is, by the rod $V^7$ being carried in a bearing $V^3$, secured to the shaft V—and when the rod $V^{11}$ receives a transverse sliding movement then the arm $V^9$ is caused to swing and turn the rod $V^7$ in its bearing $V^8$, and thereby cause a tilting of the ring $V^2$ to swing the finger V' into and out of an angular position. After the bunch has been placed on the top of the wrapping-machine by the transferring device and the wrapper has been placed in position on the platform, as described, then the butt-end of the wrapper extends under the free end of the finger V' now in the angular position shown in Fig. 26. The rotation of the cam-wheel U causes a transverse sliding movement of the shaft V in a direction away from the cam-wheel U, so that the finger V' in the angular position is moved in a like direction to reach nearly completely across the butt-end of the wrapper, and when this has been done the action of the cam-wheel U causes a downward swinging of the finger V' by moving the rod $V^{11}$ correspondingly, so that the finger V' presses the wrapper firmly in contact with the butt-end of the bunch. By this inward swinging movement of the finger V' said finger moves into the notches $V^5$ and $G^{15}$, so that the finger is now carried along and rotates with the bunch to securely hold the butt-end of the wrapper in position and to insure a proper starting of the wrapping process. When the butt-end has been wrapped around the bunch, the finger V' is bodily moved toward the cam-wheel U by the corresponding movement of the shaft V, so that the finger moves out of engagement with the wrapper and the bunch previous to the cutting mechanism K moving into action. When the finger V' has thus moved out of engagement with the wrapper and bunch, it is again swung into its angular position by the action of the cam-reach $U^5$ on the rod $V^{11}$, so that the finger moves out of engagement with the notches $V^5$ and $G^{15}$, and further rotation of the finger ceases at the time the finger stands in the uppermost position, (shown in Fig. 26,) so as to be ready to receive the butt-end of the next wrapper, as above explained.

The cutting mechanism K for cutting off the surplus material at the butt-end of the wrapper is shown more fully in Figs. 6, 21, 23, 24, 26, 27, and 28 and consists, essentially, of two rotary disk knives $K'$ $K^2$, of which the knife $K'$ is formed on the reduced end $G^{14}$ of the shaft $G^{12}$. (See Figs. 26, 27, and 28.) The other knife $K^2$ is formed with a cylindrical extension $K^3$ for traveling on the body of the cigar, and the knife $K^2$ is secured on a shaft $K^4$, journaled in suitable bearings on the arm $K^5$, mounted to swing and move the knife $K^2$ toward and from the knife $K'$ at the proper time. On the shaft $K^4$ is secured a gear-wheel $K^6$, normally out of mesh with the gear-wheel $G^{11}$, but adapted to mesh with the latter when the arm $K^5$ is swung downward to bring the knife $K^2$ in cutting relation with the knife $K'$. (See Fig. 28.) This downward swinging motion of the arm $K^5$ takes place immediately after the finger V' is withdrawn from the wrapper and the binder of the bunch, as above explained, so that the two knives $K'$ $K^2$ cut off that portion of the wrapper projecting beyond the outer end of the bunch. The arm $K^5$ is fulcrumed at $K^7$ on the main frame A, (see Fig. 23,) and on said arm is arranged a depending arm $K^8$, adapted to be engaged by a screw $K^9$, adjustably held in one arm of a bell-crank lever $K^{10}$, fulcrumed on the pivotal end of the arm $K^5$. (See Figs. 23, 24, and 25.) The other arm of the bell-crank lever $K^{10}$ carries a friction-roller $K^{11}$, traveling in a cam-groove $K^{12}$ on a cam $K^{13}$, attached to and depending from the slide $H^5$, so that when the latter moves transversely a swinging motion is given to the bell-crank lever $K^{10}$ to impart a swinging motion to the arms $K^8$ $K^5$ and move the knife $K^2$ toward or from the knife $K'$ for the purpose above explained. It is evident that by adjusting the screw $K^9$ the knife $K^2$ can be pressed with more or less force in contact with the wrapper, which extends between the two knives $K'$ $K^2$ to insure a proper cutting off of the surplus material from the butt-end of the wrapper.

The wrapper-head cutting and securing device J (see Figs. 1, 2, 4, 6, 19, 23, 26, 41) consists, essentially, of two V-shaped knives J $J^2$, adapted to move toward or from each other to close and cut the head end of the wrapper into V shape or a point, the knives when moving from each other opening up sufficiently to permit the brushes $I'$ $I^2$ to pass to the head end of the cigar and also to allow the cleaning-brush L to pass into the head end of the wrapping device, so as to clean the same after the cigar is finished and has been discharged. The knives $J'$ $J^2$ are secured on arms $J^3$ $J^4$, respectively, of which the arm $J^3$ is secured on a shaft $J^5$, extending loosely through a hollow shaft $J^6$, journaled in suitable bearings on the main frame A and carrying the arms $J^4$ for the other knife $J^2$. The ends of the shafts $J^5$ and $J^6$ (see Figs. 23 and 26) are provided with arms $J^7$ $J^8$, respectively, carrying antifriction-rollers $J^9$ $J^{10}$, traveling in cam-grooves $U^7$ $U^8$, formed on the inner face of the cam-wheel U, so that when the latter is rotated a swinging motion is given to the shafts $J^5$ $J^6$, so that the arms $J^3$ $J^4$ swing toward and from each other to close or open the knives $J'$ $J^2$ twice during every revolution of the main shaft B. Between the legs of the V-shaped knives are arranged the jaws $J^{11}$ $J^{12}$, operating in conjunction with the ends of the wrapping-rollers to form the point on the bunch and cigar and securely fix the cut head end of the wrapper in place on the bunch. The jaws $J^{11}$ $J^{12}$ may in practice be secured to or formed on convenient parts adjacent to the end of the pocket formed by the wrapping-rollers. In the instance shown (see Fig. 41$^a$) the jaw $J^{12}$, formed on the arm $J^4$ and the coacting jaw $J^{11}$, are shown formed upon a discharge-mouth W of the pasting device, presently to be described.

In order to secure the head end of the wrapper in place after the point of the wrapper is formed by the knives $J'$ $J^2$, as above described, paste or other adhesive substance is supplied to the inside of the wrapper and the outside of the bunch at the head end of the cigar, and for this purpose the necessary quantity of adhesive substance is forced periodically through a slotted mouth W (see Figs. 26 and 41) upon the wrapper and bunch between the rollers $G'$ $G^3$ at the end of the short roller $G^2$. The slotted mouth W opens into the wrapping-roller pocket at the jaw $J^{11}$ and connects with a flexible hose $W'$ containing the paste. The paste in the pot $W^2$ is constantly under pressure by means of a plunger $W^3$, pivotally connected with a lever $W^4$, fulcrumed on the main frame and carrying at its free end a weight $W^5$, adjustable on the outer end of said lever, as shown in Fig. 1. The forward end of the flexible hose $W'$ is periodically pressed by a lever $W^6$, fulcrumed on the forward cross-bar $A^9$ of the main frame A, and the free end of said lever $W^6$ is connected by a link $W^7$ with an arm $W^8$, attached to a short shaft $W^9$, journaled in the main frame A, (see Fig. 6,) and on the outer end of said shaft $W^9$ is secured an arm $W^{10}$, adapted to be engaged by a cam-lug $W^{11}$, secured on the main shaft B. (See Fig. 2.) Thus when the latter is rotated an upward swinging motion is given at each revolution of the shaft B to the arm $W^{10}$, so that the shaft $W^9$ is turned and the arm $W^8$ swings downward to cause the link $W^7$ to swing the lever $W^6$ downward, so as to squeeze the flexible hose $W^2$ and in doing so force a small quantity of paste or adhesive substance through the mouth W upon the inside of the wrapper and the outside of the bunch immediately after the wrapper-head is cut, as above described, and immediately preceding the final wrapping of the point of the wrapper upon the bunch by the jaws $J^{11}$ $J^{12}$.

In order to form a fine point on the head of the cigar, a small inclined shield X is provided and secured on a spring $X'$, secured to the main frame A, so that the shield is yieldingly mounted and extends with its face at an angle corresponding to the bevel of the point to be made on the cigar, (see Fig. 26,) it being understood that this shield X is somewhat outside of the ends of the rollers $G'$ $G^3$ $G^4$ $G^5$ and prevents the point of the bunch from getting out of alinement during the final rolling of the wrapper, it being understood that the shield X holds up the point of the cigar. The shield is pressed outward by the bottom leg of the knife $J^2$ when the knives $J'$ $J^2$ close, so that the shield is out of the way when the head end of the wrapper is cut.

The brush L for cleaning the head portion of the wrapping device after a cigar has been discharged and the knives $J'$ $J^2$ are in an open position is constructed as follows, special reference being had to Figs. 33, 34, 35, (see also Figs. 2 and 6:) The handle $L'$ of the brush L is pivoted on the upper end of a lever $L^2$, fulcrumed at $L^3$ on a bracket $A^{10}$ of the main frame A, and on said lever on opposite sides of the fulcrum $L^3$ are pivoted the arms $L^4$ $L^5$, pivotally connected with each other on opposite ends by a link $L^6$. The uppermost arm $L^4$ is also pivotally connected by a link $L^7$ with the free end of a spring $L^8$, attached to the under side of the handle $L'$ of the brush L. The arms $L^4$ and $L^5$ are adapted to be actuated by cam-lugs $L^9$ $L^{10}$ $L^{11}$, held on a segment $L^{12}$, attached to a sprocket-wheel $N^{10}$, (see Fig. 2,) secured on the main driving-shaft B, so that when the latter is rotated the cam-lugs $L^9$ $L^{10}$ $L^{11}$ act on the arms $L^4$ $L^5$ successively in such a manner that first the lug $L^9$ engages the arm $L^4$ and imparts an upward swinging motion to the same, and thereby causes the handle $L'$ to swing upward to the dotted position shown in Fig. 33, it being understood that the lever $L^2$ is held against inward swinging movement during this motion by the action of the arm $L^5$ on the cam-lug $L^{10}$; but when said arm $L^5$ moves over the lug $L^{10}$ the lug $L^9$ by further acting on the arm $L^4$ imparts a swinging motion to the lever $L^2$ to move the same inward and carry the brush L directly over the top of the now-open pocket of the wrapping device, at the head end thereof. A downward swinging movement is now given to the handle L' of the brush L, and at the same time an upward swinging movement is given to the lever $L^2$ by the action of the cam-lug $L^{11}$, which now engages the arm $L^5$, as shown in Fig. 35, so that the brush L moves successively into and out of the head end of the wrapping mechanism to remove the portion of the wrapper that has been cut off by the knives J' $J^2$ and also any surplus paste that may adhere to any of the parts in the head of the wrapping mechanism.

The operation is as follows: When the several parts of the machine are in the position illustrated in Figs. 1, 2, 3, 4, and 6, the pocket C' of the compacting device C is at the open discharge-mouth of the hopper D to receive the loose tobacco therefrom, and at the same time a previously-formed compacted filler is in a pocket of the apron, with the carriage Q on the forward stroke, the pocket of the transferring device F is in an open position at the end of the table $E^2$ to receive the bunch to be made by the next operation, the bunch made by the previous operation being in the closed pocket formed by the rollers G' $G^2$ $G^3$ $G^4$ $G^5$. The operator, standing at the front of the machine, now places a binder in a diagonal direction on the forward portion of the apron held by suction to the table $E^2$ and also places a wrapper on the platforms H' $H^2$, the butt-end of the wrapper extending over the support $H^{22}$, the outer edge of the butt of the wrapper abutting against the lug $H^{24}$ and the front or tip end of the finger V' extending over the butt-end of the wrapper. When the shaft B is rotated, the pushers $D^3$ reciprocate and push the loose tobacco from the hopper D into the pocket C' to form a compacted filler conforming to the shape of the pocket and which shape is approximately that of a finished cigar. At the same time the carriage Q during its forward movement rolls the compacted filler in its pocket, so as to insure a uniform distribution of the tobacco throughout the filler and at the same time rolls it sufficiently tight to receive the binder held down upon the apron by the finger S. As the carriage moves forward the binder is finally wound around the filler in the pocket of the apron below the rollers $E^6$ $E^9$ over the table $E^2$, and when the carriage reaches the end of its outward stroke the lever $E^{12}$ draws the apron tight in a rearward direction, so that the bunch now formed drops into the open pocket of the transferring device F, as previously explained. During this forward movement of the carriage Q and while the bunch is being formed by the apron E, the roller $E^6$, and table $E^2$ the rollers G' $G^2$ $G^3$ $G^4$ $G^5$ are rotating to presss and shape the bunch in the pocket formed by said rollers, and then the brush $H^{13}$ is caused to drop down upon the head end of the wrapper on the platform $H^2$ and immediately after the finger V' moves forward and downward to press the butt-end of the wrapper down upon the butt-end of the bunch abutting against the face of the knife K'. The finger V' now makes nearly a complete turn with the reduced end $G^{14}$ of the shaft $G^{12}$ before the platform $H^2$ begins to swing forward, so that the butt-end of the wrapper winds straight around the butt-end of the bunch, and then the wrapper as it is drawn inward around the bunch is fed spirally to the same by the forward swinging movement of the platform $H^2$, on which the head of the wrapper is held by the brush $H^{13}$. When the platform $H^2$ has swung forward about half of its forward stroke, then the arm $I^3$ swings into a downward position to bring the brushes in contact with that portion of the wrapper already wrapped around the bunch at the butt-end thereof, and at the same time the said brushes I' $I^2$ are rotated in opposite directions by the bevel gear-wheel $I^{23}$, meshing into the rotating bevel gear-wheel $I^{24}$. While the brushes I' $I^2$ rotate and travel transversely over toward the front of the machine, the arm $K^5$ of the cutting device K swings downward, so that the revolving knives K' $K^2$ cut off the surplus material from the butt-end of the wrapper in alinement with the butt-end of the bunch, it being understood that previously to the downward movement of the arm $K^5$ the finger V' is withdrawn from the wrapper. (See Fig. 28.) When the platform $H^2$ reaches the end of its forward stroke (see Fig. 19) and the head end of the wrapper has passed to the bunch, adhesive substance is supplied to the head of the wrapper at the inside thereof and to the bunch by the mechanism previously described. Then the brushes I' $I^2$ are lifted out of the top of the wrapping mechanism, and then the knives J' $J^2$ close and cut the head end of the wrapper into a point, which wrapper is now securely wrapped around the bunch, the shield X giving the proper pointed shape to the cigar and at the same time insuring a final wrapping of the point of the wrapper around the end of the bunch to finish the cigar. After the knives J' $J^2$ have closed the slide $H^5$ starts on its return movement, so that the arm $I^3$ swings upward, and in doing so swings the brush $H^{13}$ back to its uppermost position. When the slide $H^5$ reaches the end of its return stroke, the knives J' $J^2$ again open and the arms $G^6$ swing into an open position to open the pocket of the wrapping mechanism, and then the brush L swings over into the head of the pocket to remove the material cut off by the knives J' $J^2$ from the head end of the wrapper. The surplus material cut off by the knives K' $K^2$ drops out of the pocket when the arms $G^6$ swing outward with the rollers $G^4$ $G^5$. While the pocket is in an open position, the transferring device F swings over and transfers the previously-made bunch to the pocket of the wrapping mechanism and then immediately returns to its former position to bring its pocket back to the end of the table $E^2$, and as soon as the bunch has been dropped into the pocket of said wrapping mechanism the arms $G^6$ swing into a closed position and cause the rollers $G^4 G^5$ to close the pocket, and then the rollers immediately begin to revolve to give the desired final shape to the bunch. The return stroke of the carriage Q takes place about the time the slide $H^5$ reaches the end of its forward stroke, and when the said carriage has reached the end of its return stroke then the slide $C^4$ moves downward and causes the knife $C^5$ to cut off the loose tobacco at the mouth of the hopper D and the pocket $C'$, and when the now-filled pocket $C'$ moves downward in engagement with the apron E and presses the same downward firmly upon the table $E^2$ and with a portion of the apron in the pocket $C'$, then the bottom $C^6$ swings into an open position, as shown in Fig. 10, to allow the compacted filler to drop into the hollow of the apron, and then the slide $C^4$ immediately rises and the bottom $C^6$ again swings into a closed position, the knife $C^5$ finally passing the mouth of the hopper D to again establish communication between the latter and the pocket $C'$. In the meantime the carriage Q moves forward and brings the rollers $E^9 E^6$ over the compacted filler in the apron to then draw this compacted filler forward over the table $E^2$ to roll said compacted filler previously to its receiving the binder, as above described. During the forward movement of the carriage Q the apron in front of the compacted filler is gradually lifted off the table $E^2$ to uncover some of the apertures $E^3$ thereof; but the uncovered apertures are again closed immediately by the plate $Q^2$ as the latter moves forward with the carriage Q.

It is expressly understood that the feature of rolling the compacted filler previously to applying the binder is very important, as it insures the formation of uniform and proper cigar-bunches. Although the knives $J' J^2$ are shown and described as V-shaped, it is evident that different forms may be given to the same to give any desired shape to the head or flag end of the wrapper, and hence we do not limit ourselves to the V-shaped form of the knives.

The jaws $J^{11}$ and $J^{12}$ when closed give the final shape to the head of the cigar and insure a perfect wrapping of the flag or head end of the wrapper around the binder, it being understood that during this operation the shield Z is out of operation, as the jaws now firmly hold the head end of the bunch until the cigar is finished.

It is understood that the pushers $D^3$ for packing the loose tobacco into the pocket $C'$ by the action of the springs $D^7$ and without cutting or otherwise injuring the tobacco are at a standstill during the time the knife $C^5$ closes the discharge opening or mouth of the hopper. The pocket $C'$ before opening and discharging its contents presses the apron E down into the recess $E'$ to form a transversely-extending pocket in the apron at the rear of or below the top surface of the perforated part of the table $E^2$, so that the rollers $E^9 E^6$, between which passes the apron, close this apron-pocket on the top after the pocket $C'$ has discharged its contents and has risen out of the apron-pocket. The pocket $C'$ always deposits the compacted filler close to the surface of the apron, so that the tobacco in the said compacted filler is not liable to spread apart, but remains compacted. After the apron-pocket is closed by the rollers $E^9 E^6$ then the concave rear side of the roller $E^6$ during the forward movement of the carriage Q gives shape to the compacted filler in the apron-pocket as the compacted filler is rolled forward in said pocket and before it reaches the binder. During the further forward movement of the carriage Q the binder, owing to its diagonal position, is rolled spirally upon the filler, the head end of the binder being held by the finger S to the apron, said head end passing to the filler through the narrow slit between the roller $E^9$ and the apron E and then between the two layers of apron under the roller $E^6$. The apron in front of the rollers $E^9 E^6$ is held perfectly smooth upon the table-top by suction, so that said apron is not forced forward by the advancing rollers and caused to wrinkle. By this arrangement the binder is caused to roll tightly and perfectly smoothly around the filler without danger of its being twisted or torn, as would be the case if the apron became wrinkled. As the cam-grooves $A^2 A^3$ for the roller $E^6$ are different in shape, the roller rocks transversely up and down during its forward movement, thereby causing a like movement of that part of the apron on the roller E to insure the formation of a perfectly shaped or formed cigar-bunch, requiring no further treatment by the use of molds before applying the wrapper. By changing the shape of the cam-grooves $A^2 A^3$ or making the same adjustable different-shaped cigar-bunches can be produced. The head end of the binder is held temporarily by suction on the apron E; but immediately previous to the binder passing to the filler in the apron-pocket the finger S engages and holds the head end of the binder to the apron to start it onto the filler and keep it from slipping out of place. By the peculiar way the finger S is mounted in its arm $S^2$ it travels with the binder N around on the filler and at the same time moves forward with the filler as the latter is rolled in the apron-pocket over the table, and after the head end of the binder is once wrapped around the filler the said finger slips out from between the apron and binder and also moves out of the way of the knives T T'. The rollers $E^9$ and $E^6$ travel beyond the forward end of the table $E^2$ and somewhat downward, but above the pocket-forming plates $F' F^2 F^3$, and as the lever $E^{12}$ now swings rearward the apron is drawn taut between its fastened end and the roller $E^6$, so that the cigar-bunch is forced out of the apron-pocket into the open pocket of the transferring device F.

Immediately after this is done the plates F² F³ close and hold the cigar-bunch tightly in the pocket, and as soon as the carriage Q travels backward the knives T' are caused to swing and cut off the ends of the said bunch, so that all bunches, and consequently the cigars, are of uniform length. The cut-off bunch is now transferred to the rollers G' G² G³ G⁴ G⁵, and as the closed pocket formed by the plates F' F² F³ is the same shape as the bunch it is evident that the latter retains its shape when deposited between the wrapping-rollers mentioned. The brush H¹³ during the subsequent wrapping process holds the wrapper stretched while the brushes I' I² revolve in opposite directions and brush out all creases in the wrapper. The platform H² moves faster at the beginning of its forward stroke than afterward, so that the wrapper more readily conforms to the shape of the cigar, which is usually thicker toward the butt-end, said movement also causing the wrapper to be drawn very tight at the butt-end of the bunch. The wrapping-rollers G' G² G³ G⁴ G⁵ are preferably of different diameters; but as they are uniformly rotated their peripheral speed is different to insure a tight wrapping of the wrapper around the bunch. The subsequent operation of supplying paste or other adhesive substance to the wrapper insures a complete sealing of the wrapper-head, and by having the shield X the head of the cigar is formed in a perfect manner, especially as the shield holds the end of the bunch up in a central alined position with the body of the bunch. By removing the cuttings from the head of the wrapping device the latter is kept clean and clogging is prevented.

From the foregoing it is evident that when the machine is running a complete cigar is discharged from the machine at every revolution of the shaft B, and it requires about two and three-fourths of a revolution of the shaft B for the formation of a cigar—that is, for the loose tobacco in the hopper D to be formed with the binders and wrappers into a cigar. It is further understood that the several devices and mechanisms act in unison to accomplish the desired result, and as the said devices and mechanisms are positive in action it is evident that a cigar of fine workmanship is automatically produced.

Instead of holding the head of the wrapper to the platform H² by the brush H¹³ the said platform may be made hollow and perforated at the top and connected with a suction device to hold the wrapper by suction to the platform, the same as the apron E is held to the perforated table E². A similar suction device may be arranged for the support on the outer side of the wrapping-rollers to hold the butt-end of the wrapper to the support by suction, and in this case the support H²⁵ (see Figs. 42, 43) is made hollow and connected by a pipe H²⁶ with a suction device, and in the top of the support is a perforation H²⁷ alongside the abutment H²⁴.

Having thus fully described our invention, we claim as new and desire to secure by Letters Patent—

1. An automatic cigar-making machine, comprising a compacting device for forming the loose tobacco in measured quantities into a compacted filler, a rolling device receiving the compacted filler of tobacco from the said compacting device, to roll the filler and secure the binder around it to form the bunch, and a wrapping mechanism receiving the bunch from the said rolling device and wrapping the wrapper around the bunch and securing it in place, as set forth.

2. An automatic cigar-making machine, comprising a compacting device for forming the loose tobacco in measured quantities into a compacted filler, a rolling device receiving the compacted filler of tobacco from the said compacting device, to roll the filler and secure the binder around it to form the bunch, a transferring device into which the bunch is discharged by the said rolling device, and a wrapping mechanism into which the bunch is discharged by the said transferring device, the said wrapping mechanism wrapping the wrapper around the bunch and securing it in place, as set forth.

3. An automatic cigar-making machine, comprising a compacting device for forming the loose tobacco in measured quantities into a compacted filler, a rolling device receiving the compacted filler of tobacco from the said compacting device, to roll the filler and secure the binder around it to form the bunch, a transferring device into which the bunch is discharged by the said rolling device, a cutting device on the said transferring device to cut off the ends of the bunch, and a wrapping mechanism into which the bunch is discharged by the said transferring device, the said wrapping mechanism wrapping the wrapper around the bunch and securing it in place, as set forth.

4. An automatic cigar-making machine, comprising a compacting device for forming the loose tobacco in measured quantities into a compacted filler, a rolling device receiving the compacted filler of tobacco from the said compacting device, to roll the filler and secure the binder around it to form the bunch, a wrapping mechanism receiving the bunch from the said rolling device and wrapping the wrapper around the bunch and securing it in place, and means for cleaning the head portion of the said wrapping mechanism after a cigar is discharged therefrom, as set forth.

5. An automatic cigar-making machine, comprising a compacting device for forming the loose tobacco in measured quantities into a compacted filler, a rolling device receiving the compacted filler of tobacco from the said compacting device, to roll the filler and secure the binder around it to form the bunch, and a wrapping mechanism receiving the bunch from the said rolling device and wrapping the wrapper around the bunch and securing it in place, the said wrapping mechanism having a wrapper-smoothing device for smoothing the wrapper on the bunch during the wrapping process, as set forth.

6. An automatic cigar-making machine, comprising a compacting device for forming the loose tobacco in measured quantities into a compacted filler, a rolling device receiving the compacted filler of tobacco from the said compacting device, to roll the filler and secure the binder around it to form the bunch, and a wrapping mechanism receiving the bunch from the said rolling device and wrapping the wrapper around the bunch and securing it in place, the said wrapping mechanism having a cut-off device for cutting off the butt-end of the wrapper during the wrapping process, as set forth.

7. An automatic cigar-making machine, comprising a compacting device for forming the loose tobacco in measured quantities into a compacted filler, a rolling device receiving the compacted filler of tobacco from the said compacting device, to roll the filler and secure the binder around it to form the bunch, and a wrapping mechanism receiving the bunch from the said rolling device and wrapping the wrapper around the bunch and securing it in place, the said wrapping device having means for cutting the head end of the wrapper previously to wrapping the head end onto the bunch, as set forth.

8. An automatic cigar-making machine, comprising a compacting device for forming the loose tobacco in measured quantities into a compacted filler, a rolling device receiving the compacted filler of tobacco from the said compacting device, to roll the filler and secure the binder around it to form the bunch, and a wrapping mechanism receiving the bunch from the said rolling device and wrapping the wrapper around the bunch and securing it in place, the said wrapping device having a cutting device for forming a point on the head end of the wrapper, and a pasting device for delivering paste to the head end of the wrapper after the said end is cut to a point, as set forth.

9. An automatic cigar-making machine, controlled by a definite revolving agent, consisting of a compacting device for forming the loose or scrap tobacco in measured quantities into a compacted filler, a rolling device for which the said compacting device forms the feed, said rolling device rolling the filler and securing the binder around it, to form the bunch, a wrapping mechanism receiving the bunch from said rolling device and placing the wrapper around it, means for actuating said devices and mechanism in unison, and a main or power shaft for said means, as set forth.

10. An automatic cigar-making machine controlled by a definite revolving agent, consisting of a compacting device for forming the loose or scrap tobacco in measured quantities into a compacted filler, a rolling device for which the said compacting device forms the feed, said rolling device rolling the filler and securing the binder around it to form the bunch, a transferring device, a wrapping mechanism receiving the bunch by the said transferring device from the said rolling device, means for actuating the said devices, and a main or power shaft for the said means, as set forth.

11. An automatic cigar-making machine having a hopper for containing loose or scrap tobacco, a compacting-pocket at the discharge-opening of said hopper, pushers mounted to slide independently one of the other on the bottom of the said hopper for pushing the tobacco into said pocket and packing it therein, and means for imparting movement to the said pushers, as set forth.

12. An automatic cigar-making machine having a hopper for containing loose or scrap tobacco, a compacting-pocket extending across the discharge-opening of said hopper, and pushers mounted to slide on the bottom of the hopper toward and from said pocket, said pushers having ratchet-teeth on their upper faces, as set forth.

13. An automatic cigar-making machine having a hopper with an inclined bottom and arranged to contain loose or scrap tobacco, a compacting-pocket extending across the discharge-opening of said hopper, and spring-pressed pushers arranged on said hopper-bottom and mounted to slide successively toward or from said pocket, said pushers being formed at their upper surfaces with ratchet-teeth, for straightening out the tobacco in the hopper prior to pushing the same into said pocket, as set forth.

14. An automatic cigar-making machine having a hopper for containing loose or scrap tobacco, a compacting-pocket extending across the discharge-opening of said hopper, pushers mounted to slide on the bottom of the hopper, and springs for forcing the pushers toward said opening, to push the tobacco into said pocket and pack it therein, as set forth.

15. An automatic cigar-making machine having a hopper for containing loose or scrap tobacco, a compacting-pocket extending across the discharge-opening of said hopper, pushers mounted to slide on the bottom of the hopper, springs for forcing the pushers toward said opening, to push the tobacco into said pocket and pack it therein, and cam-arms or wipers for engaging said pushers and moving the same outward against the tension of said springs, as set forth.

16. An automatic cigar-making machine having a hopper for containing loose or scrap tobacco, a compacting-pocket extending across the discharge-opening of said hopper, pushers mounted to slide on the bottom of the hopper, springs for forcing the pushers toward said opening, to push the tobacco into said pocket and pack it therein, a revoluble cam-shaft, and cam-arms or wipers thereon, and adapted to engage depending arms on said pushers, to move the latter against the springs and from said hopper discharge-opening, as set forth.

17. An automatic cigar-making machine having a hopper for containing loose or scrap tobacco, a compacting-pocket extending across the discharge-opening of said hopper, pushers mounted to slide on the bottom of the hopper, springs for forcing the pushers toward said opening, to push the tobacco into said pocket and pack it therein, a revoluble cam-shaft, and cam-arms or wipers thereon, and adapted to engage depending arms on said pushers, to move the latter against the springs and from said hopper discharge-opening, said cam-arms being set at an angle to one another, to impart a successive sliding motion to the pushers, as set forth.

18. An automatic cigar-making machine having a hopper for containing loose or scrap tobacco, a compacting-pocket at the discharge-opening of the hopper, pushers mounted to slide independently one of the other on the bottom of the hopper for pushing the tobacco into said pocket and packing it therein, means for imparting movement to said pushers, and an agitator in the hopper above the said pushers for keeping the tobacco therein loose and for insuring proper feed of the tobacco into the pocket by the pushers, as set forth.

19. An automatic cigar-making machine having a hopper for containing loose or scrap tobacco, a compacting-pocket extending across the discharge-opening of said hopper, pushers mounted to slide on the bottom of the hopper, an agitator in said hopper, and means for intermittently actuating said pushers and said agitator in unison, as set forth.

20. An automatic cigar-making machine having a hopper for containing loose or scrap tobacco, a compacting-pocket extending across the discharge-opening of said hopper, pushers mounted to slide on the bottom of the hopper, springs for forcing the pushers toward said opening and pushing the tobacco into said pocket and packing it therein, a revoluble cam-shaft, cam-arms or wipers thereon for engaging arms on said pushers and moving the latter against the springs and from said hopper discharge-opening, agitator-arms in said hopper, a rock-shaft carrying said arms, and a connection between said cam-shaft and said rock-shaft, for actuating the latter from the cam-shaft, as set forth.

21. An automatic cigar-making machine having a hopper for containing loose or scrap tobacco, a compacting-pocket extending across the discharge-opening of said hopper, pushers mounted to slide on the bottom of the hopper, springs for forcing the pushers toward said opening and pushing the tobacco into said pocket and packing it therein, a revoluble cam-shaft, cam-arms or wipers thereon for engaging arms on said pushers and moving the latter against the springs and from said hopper discharge-opening, agitator-arms in said hopper, a rock-shaft carrying said arms, and a connection between said cam-shaft and said rock-shaft, for actuating the latter from the cam-shaft, said connection comprising an eccentric on the cam-shaft, and an arm on the rock-shaft and pivotally connected with the eccentric-rod of said eccentric, as set forth.

22. An automatic cigar-making machine having a hopper for containing loose or scrap tobacco, compacting-pocket movable to and from the discharge-opening of said hopper, and a knife movable on said hopper over the discharge-opening thereof, to cut off the tobacco in the hopper and to close the said discharge-opening, the said knife also forming a side for the said pocket when the latter is moving from and to said discharge-opening, as set forth.

23. An automatic cigar-making machine having a compacting-pocket into which tobacco is mechanically packed, said pocket having a hinged bottom and an adjustable top, for giving the desired shape to said top, as set forth.

24. An automatic cigar-making machine having a compacting-pocket into which tobacco is mechanically packed, said pocket having a flexible top, and means for giving the desired curvature to the top, as set forth.

25. An automatic cigar-making machine having a compacting-pocket into which tobacco is mechanically packed, said pocket comprising a hinged bottom, a knife movable over the inlet to said pocket and arranged to form one side thereof when closed, and an adjustable top for the pocket, as set forth.

26. An automatic cigar-making machine having a compacting-pocket into which tobacco is mechanically packed, said pocket comprising a hinged bottom, a knife movable over the inlet to the pocket and arranged to form one side thereof when closed, a flexible top, and means for supporting said top and changing the curvature thereof, as set forth.

27. An automatic cigar-making machine having a compacting-pocket into which tobacco is mechanically packed, said pocket comprising a hinged bottom, a knife movable over the inlet to the pocket and arranged to form one side thereof when closed, an adjustable top, and means for imparting a swinging motion to said hinged bottom, to open and close the same, as set forth.

28. An automatic cigar-making machine having a hopper provided with a discharge-opening, a slide arranged to reciprocate on the side of the hopper, a pocket-carrier movable on said slide, and a pocket carried partly by said pocket-carrier and partly by said slide, as set forth.

29. An automatic cigar-making machine having a hopper provided with a discharge-opening, a slide mounted to reciprocate on the side of the hopper, a pocket-carrier movable on said slide, a pocket carried partly by said pocket-carrier and partly by said slide, means for imparting a reciprocating motion to said slide, and means controlled by the slide, for imparting a reciprocating motion to the pocket-carrier, as set forth.

30. An automatic cigar-making machine having a hopper provided with a discharge-opening, a slide mounted to reciprocate on the side of the hopper, a pocket-carrier movable on said slide, a pocket carried partly by said pocket-carrier and partly by said slide, said pocket comprising a knife fixed on said slide, a bottom hinged to said carrier, and a top adjustably carried by said pocket-carrier, as set forth.

31. An automatic cigar-making machine having a hopper provided with a discharge-opening, a slide mounted to reciprocate on the side of the hopper, a pocket-carrier movable on said slide, a pocket carried partly by said pocket-carrier and partly by said slide, said pocket comprising a knife fixed on said slide, a bottom hinged to said carrier, a top adjustably carried by said pocket-carrier, and means for imparting a swinging motion to said hinged bottom, to open and close the same, as set forth.

32. An automatic cigar-making machine having a hopper provided with a discharge-opening, a slide mounted to reciprocate on the side of the hopper, a pocket-carrier movable on said slide, a pocket carried partly by said pocket-carrier and partly by said slide, said pocket comprising a knife fixed on said slide, a bottom hinged to said carrier, a top adjustably carried by said pocket-carrier, and means for imparting a swinging motion to said hinged bottom, to open and close the same, said means comprising arms having lugs, and fixed pins for engagement by the lugs, as set forth.

33. An automatic cigar-making machine having a hopper, a slide reciprocating on the side of the said hopper, a pocket-carrier movable on said slide, a pocket comprising a knife fixed on said slide, a bottom hinged to said pocket-carrier, a flexible top adjustably carried by said pocket-carrier, and means for imparting sliding movement to said pocket-carrier, as set forth.

34. An automatic cigar-making machine having a hopper, a slide reciprocating on the side of the said hopper, a pocket-carrier movable on said slide, a pocket comprising a knife fixed on said slide, a bottom hinged to said pocket-carrier, a flexible top adjustably carried by said pocket-carrier, and means for imparting a sliding movement to said pocket-carrier, said means being controlled by said slide, as set forth.

35. An automatic cigar-making machine having a hopper, a slide reciprocating on the side of the said hopper, a pocket-carrier movable on said slide, a pocket comprising a knife fixed on said slide, a bottom hinged to said pocket-carrier, and means for imparting sliding movement to said pocket-carrier, and comprising bell-crank levers fulcrumed on the slide and engaging said carrier, and cam-grooves on said hopper, as set forth.

36. An automatic cigar-making machine having a hopper, a slide reciprocating on the side of the said hopper, a pocket-carrier movable on said slide, a pocket comprising a knife fixed on said slide, a bottom hinged to said pocket, bell-crank levers fulcrumed on the slide and engaging said carrier and shoes in cam-grooves on the said hopper for controlling the movement of the bell-crank levers, as set forth.

37. An automatic cigar-making machine having a hopper, a cut-off knife for the discharge end of said hopper, pushers in the hopper for feeding tobacco to said discharge end, and means for imparting movement to said cut-off knife and to said pushers, to actuate the latter while the cut-off knife is in an open position, and to move and hold the knife in a closed position when the pushers are at rest, as set forth.

38. An automatic cigar-making machine having a hopper with a discharge-opening, a compacting-pocket movable on the side of said hopper and having a cut-off knife and a movable bottom, the cut-off knife being arranged to close the said discharge-opening and to form a side of the pocket, an apron, and means for moving said pocket from said opening into engagement with said apron, to form a pocket therein for the reception of the compacted filler contained in said compacting-pocket, the said knife closing the discharge-opening during the movement of the pocket from and to said opening, as set forth.

39. An automatic cigar-making machine having a hopper with a discharge-opening, a compacting-pocket movable on the side of said hopper and having a cut-off knife and a movable bottom, the cut-off knife being arranged to close the said discharge-opening and to form a side of the pocket, an apron, means for moving said pocket from said opening into engagement with said apron, to form a pocket therein for the reception of the compacted filler contained in said compacting-pocket, the said knife closing the discharge-opening during the movement of the pocket from and to said opening, and means for moving said bottom after the apron-pocket is formed to open the compacting-pocket, to drop the compacted filler into the apron-pocket, as set forth.

40. An automatic cigar-making machine having a hopper with a discharge-opening, a compacting-pocket movable on the side of said hopper and having a cut-off knife and a movable bottom, the cut-off knife being arranged to close the said discharge-opening and to form a side of the pocket, an apron, means for moving said pocket from said opening into engagement with said apron, to form a pocket therein for the reception of the compacted filler contained in said compacting-pocket, the said knife closing the discharge-opening during the movement of the pocket from and to said opening, and means for imparting supplementary movement to the knife independent of the pocket, as set forth.

41. An automatic cigar-making machine having a table with a recess, an apron extending over the said table, a compacting-pocket having a hinged bottom, means for moving said compacting-pocket into engagement with said apron by said table-recess, to force the apron into the recess and thereby produce a pocket in the apron, and means for swinging the bottom open while in contact with the apron, to allow the compacted filler to pass into the apron-pocket, without the compacted filler opening up, as set forth.

42. An automatic cigar-making machine having a perforated table, an apron, and a suction device for holding the apron by suction to said table, the suction taking place through the perforations in the said table as set forth.

43. An automatic cigar-making machine having a table, an apron having an aperture, and a suction device for holding the apron by suction to the table and for holding a binder by suction to the apron at said aperture, as set forth.

44. An automatic cigar-making machine having a perforated table, an apron extending over the table, and a suction-chamber in communication with the perforations in the table, to hold the apron by suction to the table, said apron having an aperture in register with one of the perforations in the table, to hold one end of a binder by suction to the apron, as set forth.

45. An automatic cigar-making machine having a perforated table, an apron over said table and held thereon by suction through the perforations of the table, the apron having a pocket for containing a filler of tobacco, a reciprocating carriage, and a roller journaled on said carriage and over which passes the apron, as set forth.

46. An automatic cigar-making machine having a perforated table, an apron over said table and held thereon by suction through the perforations of the table, the apron having a pocket for containing a filler of tobacco, a reciprocating carriage, a roller journaled on said carriage and over which passes the apron, and a cut-off plate on said carriage, for covering up the perforations of the table as the apron leaves the same during the forward movement of the carriage, as set forth.

47. An automatic cigar-making machine having a table, an apron over said table, and having a pocket for containing a filler, a reciprocating carriage, a roller supported by the carriage and engaged by the apron, and a finger supported from the carriage, and adapted to engage a binder and hold the latter to the apron and start it onto the filler, said finger being mounted to swing on one end thereof as the fulcrum, as set forth.

48. An automatic cigar-making machine having a finger for engagement with a binder and mounted to swing, one end of the finger being the fulcrum, as set forth.

49. An automatic cigar-making machine having an arm mounted to swing, means for moving the arm endwise and a finger fulcrumed at one end on said arm, to allow the finger to swing, said finger being adapted to engage one end of the binder and hold the latter to the rolling-apron, as set forth.

50. An automatic cigar-making machine having an arm mounted to swing, means for moving the arm endwise, a finger having a head loosely mounted on said arm, and a spring carried by the arm, and engaging said head, as set forth.

51. An automatic cigar-making machine having a table, an apron over the table and provided with a pocket for containing a filler, a reciprocating carriage, a roller carried thereby and engaged by said apron, an arm moving with said carriage and arranged to swing toward or from said apron, and a finger carried by said arm and adapted to engage the binder on said apron, as set forth.

52. An automatic cigar-making machine having a table, an apron over the table and provided with a pocket for containing a filler, a reciprocating carriage, a roller carried thereby and engaged by said apron, an arm moving with said carriage and arranged to swing toward or from said apron, a finger carried by said arm and adapted to engage the binder on said apron, and means for imparting a swinging motion to said arm from said carriage, as set forth.

53. An automatic cigar-making machine having a reciprocating carriage, a slide mounted thereon, an arm fulcrumed on said slide and carrying a finger for engaging the binder, means for imparting motion to said slide independently of the movement of the carriage, and means for imparting a swinging motion to said arm, as set forth.

54. An automatic cigar-making machine having a reciprocating carriage, a slide mounted thereon, an arm fulcrumed on said slide and carrying a finger for engaging a pointer, a pin extending from the fulcrum end of said arm, a link pivotally connected with said slide and having a cam-slot engaged by said pin, a segmental gear-wheel connected with said link and means for imparting an intermittent rotary motion to said segmental gear-wheel, as set forth.

55. An automatic cigar-making machine having a reciprocating carriage, a slide mounted thereon, an arm fulcrumed on said slide and carrying a finger for engaging a pointer, a pin extending from the fulcrum end of said arm, a link pivotally connected with said slide and having a cam-slot engaged by said pin, a segmental gear-wheel connected with said link and having an intermittent rotary motion, and sets of pins for engaging said segmental gear-wheel, as set forth.

56. An automatic cigar-making machine having a reciprocating carriage with a guideway having a curved end, a slide in said guideway, an arm fulcrumed on said slide and carrying a finger for engaging a binder, a pin extending from the fulcrum end of said arm, a link pivotally connected with said slide and having a cam-slot engaged by said pin, a segmental gear-wheel connected with the link and means for imparting an intermittent rotary motion to the said segmental gear-wheel, as set forth.

57. An automatic cigar-making machine having a slide mounted to move in a guideway with a curved end, an arm fulcrumed on said slide and carrying a finger for engaging a binder, and means, substantially as described, for imparting a reciprocating movement to said slide, and at the same time a swinging motion to said arm, as set forth.

58. An automatic cigar-making machine having a reciprocating carriage, a roller moving with said carriage, and fixed guideways of different shape and engaged by the ends of said roller, so that upon reciprocating the carriage the roller moves with it and rocks in a plane at an angle to the plane of movement of the carriage, as set forth.

59. An automatic cigar-making machine having a carriage, and a roller moving with the carriage and having a rocking motion in a plane at an angle to the plane in which the carriage moves, as set forth.

60. An automatic cigar-making machine having a carriage, and a roller moving with the carriage and having a rocking motion in a plane at an angle to the plane in which the carriage moves, said roller having a concave face, as set forth.

61. An automatic cigar-making machine having an apron, a roller over which the apron passes, to roll a filler, and to roll a binder around said filler, said roller having a curved shaft, collars of different diameters and mounted to turn loosely on said shaft, a carriage having a reciprocating movement, arms pivoted on said carriage and engaging said shaft, and fixed guideways of different shape and engaged by the ends of said roller-shaft, to impart a rocking motion to the roller in a plane at an angle to the plane of movement of the carriage, as set forth.

62. An automatic cigar-making machine having a reciprocating carriage, a fixed table, an apron over said table, a roller having a curved shaft, collars mounted to turn thereon, arms pivoted to said carriage and supporting said shaft, and fixed guideways of different shape and engaged by the ends of said shaft, as set forth.

63. An automatic cigar-making machine having a bunch-forming device, a transferring device into which discharges said bunch-forming device, a wrapping mechanism into which discharges said transferring device, a driven shaft, and means for actuating in unison said bunch-forming device, the transferring device and the wrapping mechanism, as set forth.

64. An automatic cigar-making machine having a lever with a fixed plate, means for imparting a swinging motion to said lever, and a plurality of levers fulcrumed on said first-named lever and moving with the same, and having plates forming in conjunction with the first-named plate a pocket, as set forth.

65. An automatic cigar-making machine having a lever with a fixed plate, means for imparting a swinging motion to said lever, a plurality of levers fulcrumed on said first-named lever and moving with the same, and having plates forming in conjunction with the first-named plate a pocket, for receiving and holding the filler, one of the plates having an ejecting-plate for forcing the filler out of the pocket, and means for operating the said ejecting-plate, as set forth.

66. An automatic cigar-making machine having a lever with a fixed plate, means for imparting a swinging motion to said lever, a plurality of levers fulcrumed on said first-named lever and moving with the same, and having plates forming in conjunction with the first-named plate a pocket, and means for actuating the last-named levers independently of the first-named lever, as set forth.

67. An automatic cigar-making machine having a transferring-pocket with a plurality of plates, two of which form opposite sides and one the bottom of the pocket, one of said side plates having movement toward the other plates, and means for operating the said movable side plate to close or open the pocket, as set forth.

68. An automatic cigar-making machine having a transferring-pocket, comprising a plurality of plates, two of which form opposite sides and one the bottom of the pocket, the bottom plate having movement between said side plates to eject the filler from the pocket, as set forth.

69. An automatic cigar-making machine having a transferring-pocket, comprising a plurality of plates, two of which form opposite sides and one the bottom of the pocket, the bottom plate having movement between said side plates to eject the filler from the pocket, and means, substantially as described, for imparting movement to the said plates, as set forth.

70. An automatic cigar-making machine having a wrapping mechanism, a transferring device for holding a bunch, a shaft, and means actuated from said shaft and connected with and actuating said wrapping mechanism and said transferring device in unison, to discharge the bunch from said transferring device to the wrapping mechanism, as set forth.

71. An automatic cigar-making machine having a wrapping mechanism, a transferring device for holding a bunch, a shaft, and means actuated from said shaft and connected with and actuating said wrapping mechanism and said transferring device in unison, to discharge the bunch from said transferring device to the wrapping mechanism, and to cause said wrapping mechanism and transferring device to automatically open for the transferring device to discharge the bunch into the open wrapping mechanism, as set forth.

72. An automatic cigar-making machine having a fixed wrapper-platform, means for rolling a wrapper around a bunch, a slide having an intermittent sliding movement lengthwise of said means, a platform pivoted to a fixed part and extending partly under said fixed platform, a connection between said slide and said pivoted platform, to impart a swinging motion to the latter, a brush hinged to the swinging platform for holding the head of the wrapper in place on the swinging platform, revoluble brushes operating in conjunction with said wrapping means, an arm pivoted on said slide carrying said revoluble brushes, and controlling the movement of said platform-brush, and means for imparting movement to said arm, as set forth.

73. An automatic cigar-making machine having a fixed wrapper-platform, means for rolling a wrapper around a bunch, a slide having an intermittent sliding movement lengthwise of said means, a platform pivoted to a fixed part and extending partly under said fixed platform, a connection between said slide and said pivoted platform, to impart a swinging motion to the latter, a brush hinged to the swinging platform for holding the head of the wrapper in place on the swinging platform, revoluble brushes operating in conjunction with said wrapping means, an arm pivoted on said slide carrying said revoluble brushes, and controlling the movement of said platform-brush, a driven cam-wheel, an operative connection between said cam-wheel and said slide, to impart an intermittent sliding motion to the slide, and an operative connection between said cam-wheel and said brush-carrying arm, as set forth.

74. An automatic cigar-making machine having a plurality of wrapping-rollers forming a pocket for receiving a bunch and wrapping a wrapper around said bunch, a slide arranged to move lengthwise of said wrapping-rollers, a wrapper-platform for feeding the wrapper to said rollers and pivoted to a fixed part, a connection between the slide and platform for imparting a swinging motion to the latter, a shoe carried by said slide, a shaft having a double spiral groove engaged by said shoe, and a driven cam gear-wheel for intermittently rotating said shaft, as set forth.

75. An automatic cigar-making machine having a plurality of wrapping-rollers forming a pocket for receiving a bunch and wrapping a wrapper around said bunch, a slide arranged to move lengthwise of said wrapping-rollers, a wrapper-platform for feeding the wrapper to said rollers and pivoted to a fixed part, a connection between the slide and platform for imparting a swinging motion to the latter, a shoe carried by said slide, a shaft having a double spiral groove engaged by said shoe, a driven cam gear-wheel for intermittently rotating said shaft, brushes for brushing the wrapper tight around the bunch, and an arm pivoted on said slide and carrying said brushes, said arm receiving an intermittent swinging motion from said cam gear-wheel, as set forth.

76. An automatic cigar-making machine having a plurality of wrapping-rollers forming a pocket for receiving a bunch and wrapping a wrapper around said bunch, a slide arranged to move lengthwise of said wrapping-rollers, a wrapper-platform for feeding the wrapper to said rollers and pivoted to a fixed part, a connection between the slide and platform for imparting a swinging motion to the latter, a shoe carried by said slide, a shaft having a double spiral groove engaged by said shoe, a driven cam gear-wheel for intermittently rotating said shaft, brushes for brushing the wrapper tight around the bunch, an arm pivoted on said slide and carrying said brushes, said arm receiving an intermittent swinging motion from said cam gear-wheel, and operative connections between said cam gear-wheel and said shaft, and between the cam gear-wheel and said arm, as set forth.

77. An automatic cigar-making machine having a plurality of wrapping-rollers forming a pocket for receiving a bunch and wrapping a wrapper around said bunch, a slide arranged to move lengthwise of said wrapping-rollers, a wrapper-platform for feeding the wrapper to said rollers and pivoted to a fixed part, a connection between the slide and platform for imparting a swinging motion to the latter, a shoe carried by said slide, a shaft having a double spiral groove engaged by said shoe, a driven cam gear-wheel for intermittently rotating said shaft, brushes for brushing the wrapper tight around the bunch, an arm pivoted on said slide and carrying said brushes, said arm receiving an intermittent swinging motion from said cam gear-wheel, and means for intermittently rotating said brushes from said shaft, as set forth.

78. An automatic cigar-making machine having a plurality of wrapping-rollers forming a pocket for receiving a bunch and wrapping a wrapper around said bunch, a slide arranged to move lengthwise of said wrapping-rollers, a wrapper-platform for feeding the wrapper to said rollers and pivoted to a fixed part, a connection between the slide and platform for imparting a swinging motion to the latter, a shoe carried by said slide, a shaft having a double spiral groove engaged by said shoe, a driven cam gear-wheel for intermittently rotating said shaft, brushes for brushing the wrapper tight around the bunch, an arm pivoted on said slide and carrying said brushes, said arm receiving an intermittent swinging motion from said cam gear-wheel, and a flat brush pivoted on said platform and controlled by means on said revoluble brush-carrying arm, as set forth.

79. An automatic cigar-making machine having rollers for wrapping a wrapper around a bunch, a slide moving lengthwise of the rollers, an arm pivoted on said slide, revoluble brushes journaled in said arm, a segmental gear-wheel on said arm, and racks having movement in the direction of the movement of the slide, and adapted to mesh with said segmental gear-wheel, as set forth.

80. An automatic cigar-making machine having rollers for wrapping a wrapper around a bunch, a slide moving lengthwise of the rollers, an arm pivoted on said slide, revoluble brushes journaled in said arm, a segmental gear-wheel on said arm, racks having movement in the direction of the movement of the slide, and adapted to mesh with said segmental gear-wheel, a shaft carrying said racks, and a cam-wheel for imparting a sliding motion to said shaft, as set forth.

81. An automatic cigar-making machine having rollers for wrapping a wrapper around a bunch, a slide moving lengthwise of the rollers, an arm pivoted on said slide, revoluble brushes journaled in said arm, a segmental gear-wheel on said arm, racks having movement in the direction of the movement of the slide, and adapted to mesh with said segmental gear-wheel, a shaft on which said racks are pivoted, springs pressing on the free ends of said racks, and a cam-wheel for imparting a sliding movement to said shaft, as set forth.

82. An automatic cigar-making machine having a plurality of wrapping-rollers forming a pocket for a bunch, and arranged to wrap a wrapper around said bunch, a fixed platform on one side of the rollers, a support on the other side of the rollers at or near one end thereof, to support the wrapper on both sides of the opening leading to the pocket, and a lug on said support to form an abutment for one edge of the wrapper, as set forth.

83. An automatic cigar-making machine having a plurality of wrapping-rollers forming a pocket for a bunch, and arranged to wrap a wrapper around said bunch, a fixed platform on one side of the rollers, a support on the other side of the rollers at or near one end thereof, to support the wrapper on both sides of the opening leading to the pocket, a lug on said support to form an abutment for one edge of the wrapper, and a finger adapted to engage the top of the wrapper between said support and said platform, directly over the pocket-opening, as set forth.

84. An automatic cigar-making machine having a plurality of rotating rollers forming a pocket, arms mounted to swing at one end of the pocket and transversely of the same, head-forming devices adjacent to the end of the pocket, and a yieldingly-mounted shield between the arms at the end of the pocket, as set forth.

85. An automatic cigar-making machine having a plurality of rotating rollers forming a pocket, arms mounted to swing at one end of the pocket and transversely of the same, head-forming devices adjacent to the end of the pocket, a yieldingly-mounted shield between the arms at the end of the pocket, and V-shaped knives secured on said arms, to cut the head end of the wrapper, said head-forming devices being inclosed by the knives, as set forth.

86. An automatic cigar-making machine having a plurality of rotating rollers forming a pocket, arms mounted to swing at one end of the pocket and transversely of the same, head-forming devices adjacent to the end of the pocket, a yieldingly-mounted shield between the arms at the end of the pocket, V-shaped knives secured on said arms, to cut the head end of the wrapper, said head-forming devices being inclosed by the knives, concentric shafts carrying said knife-arms, and a driven cam-wheel having connection with said concentric shafts for rocking the shafts in opposite directions, as set forth.

87. An automatic cigar-making machine having a brush, and means for moving the brush into and out of the cigar-head-forming device for cleaning the same, as set forth.

88. An automatic cigar-making machine having a cigar-head-forming device, a brush for cleaning the cigar-head-forming device, and means for imparting an up-and-down and a transverse motion to said brush, as set forth.

89. An automatic cigar-making machine having a brush, a lever on which the handle of the brush is pivoted, means for imparting a swinging motion to said lever in a transverse direction, and means for imparting an up-and-down swinging motion to said brush, as set forth.

90. An automatic cigar-making machine having a brush, a lever on which the handle of the brush is pivoted, arms fulcrumed on said lever on opposite sides of its fulcrum, a link connecting the arms with each other, a second link connecting one of the arms with the handle of the brush, and a cam device for said arms, for imparting motion thereto and to said lever, as set forth.

91. An automatic cigar-making machine having a brush, a lever on which the handle of the brush is pivoted, arms fulcrumed on said lever on opposite sides of its fulcrum, a link connecting the arms with each other, a second link connecting one of the arms with the handle of the brush, and a cam device for said arms, for imparting motion thereto and to said lever, said cam device comprising a driven wheel, and cam-lugs on said wheel, and arranged to engage said arms, as set forth.

92. An automatic cigar-making machine having a plurality of rollers forming a pocket for receiving a bunch and for wrapping a wrapper around said bunch, a finger for carrying the butt-end of the wrapper to the butt-end of the bunch in said pocket, a ring on which said finger is secured, a sleeve on which the ring is pivoted, a revoluble shaft on which the sleeve is mounted to slide loosely, said shaft having means for engagement by the finger to turn the same around with the shaft, a shifter for the sleeve, a slide-shaft having a bearing for said shifter, a slide-rod for rocking the shifter in its bearing, and a cam gear-wheel for actuating the slide-shaft and said slide-rod, as set forth.

93. An automatic cigar-making machine having a plurality of rollers forming a pocket for receiving a bunch and for wrapping a wrapper around said bunch, a finger for carrying the butt-end of the wrapper to the butt-end of the bunch in said pocket, a ring on which said finger is secured, a sleeve on which the ring is pivoted, a revoluble shaft having means for engagement by the finger to turn the same around with the shaft, a shifter for the sleeve, a slide-shaft having a bearing for said shifter, a slide-rod for rocking the shifter in its bearing, a cam gear-wheel for actuating the slide-shaft and said slide-rod, and means for driving said revoluble shaft from said cam gear-wheel, as set forth.

94. In a cigar-machine, the combination of mechanism for forming a bunch, mechanism for wrapping a bunch, mechanism for transferring the bunch from the bunch-forming mechanism to the wrapping mechanism, and mechanism for causing the several operations to occur in proper sequence.

In testimony whereof we have signed our names to this specification in the presence of two subscribing witnesses.

BENJAMIN H. SNAVELY.
THOMAS H. KELLER.

Witnesses:
BENJAMIN F. FRAELICH,
BENJAMIN B. SNAVELY.